(12) United States Patent
Liu et al.

(10) Patent No.: US 10,313,870 B2
(45) Date of Patent: Jun. 4, 2019

(54) IDENTITY VERIFICATION METHOD AND APPARATUS, AND STORAGE MEDIUM

(71) Applicant: Beijing Xiaomi Mobile Software Co., Ltd., Haidian District, Beijing (CN)

(72) Inventors: Lijun Liu, Beijing (CN); Yang Chen, Beijing (CN); Daokuan Liu, Beijing (CN)

(73) Assignee: BEIJING XIAOMI MOBILE SOFTWARE CO., LTD., Haidian District, Beijing ( * ) Notice: Subject to any disclaimer, the term of this patent is extended or adjusted under 35 U.S.C. 154(b) by 0 days.

(21) Appl. No.: 15/818,774

(22) Filed: Nov. 21, 2017

(65) Prior Publication Data
US 2018/0146363 A1    May 24, 2018

(30) Foreign Application Priority Data

Nov. 21, 2016  (CN) .......................... 2016 1 1042990

(51) Int. Cl.
*H04W 8/18*  (2009.01)
*H04W 12/02* (2009.01)
(Continued)

(52) U.S. Cl.
CPC .......... *H04W 8/18* (2013.01); *H04L 63/0853* (2013.01); *H04L 63/0876* (2013.01); *H04W 4/12* (2013.01);
(Continued)

(58) Field of Classification Search
CPC ....... H04W 12/00; H04W 8/183; H04W 8/18; H04W 12/02
(Continued)

(56) References Cited

U.S. PATENT DOCUMENTS 7,437,563 B2 * 10/2008 Vaha-Sipila ............ G06F 21/51
                                                    455/410
7,640,039 B2 * 12/2009 Kamada .......... H04M 1/274516
                                                    455/412.1
(Continued)

FOREIGN PATENT DOCUMENTS

CN      102143482 A      8/2011
CN      102395119 A      3/2012
(Continued)

OTHER PUBLICATIONS

Google Patent translation of CN105450416A, Jul. 30, 2018.*
(Continued)

*Primary Examiner* — William D Cumming
(74) *Attorney, Agent, or Firm* — Jun He Law Offices P.C.; James J. Zhu

(57) ABSTRACT

An identity verification method includes: receiving an identity verification instruction from a server; in response to the identity verification instruction, determining local hardware information of local hardware and first pre-stored mobile phone number information, wherein the first pre-stored mobile phone number information is mobile phone number information pre-stored locally; sending, to the server, the local hardware information and the first pre-stored mobile phone number information as identity information to be verified; and receiving a verification result generated by the server based on the identity information to be verified. The technical solutions according to the disclosure can simplify operations for identity verification.

17 Claims, 21 Drawing Sheets

(51) Int. Cl.
*H04W 4/12* (2009.01)
*H04W 4/14* (2009.01)
*H04W 12/06* (2009.01)
*H04L 29/06* (2006.01)
*H04W 12/08* (2009.01)

(52) U.S. Cl.
CPC .............. *H04W 4/14* (2013.01); *H04W 12/06* (2013.01); *H04W 12/08* (2013.01)

(58) Field of Classification Search
USPC .............. 455/411, 412.1, 416, 466, 558, 410
See application file for complete search history.

(56) References Cited

U.S. PATENT DOCUMENTS

| | | | | |
|---|---|---|---|---|
| 8,831,581 | B2* | 9/2014 | Bender | H04M 3/42382 455/416 |
| 9,131,047 | B2* | 9/2015 | Roundtree | G09B 7/02 |
| 9,152,965 | B2* | 10/2015 | Boylan | G06Q 20/02 |
| 9,674,696 | B2* | 6/2017 | Bai | H04W 8/183 |
| 2005/0187873 | A1* | 8/2005 | Labrou | G06Q 20/02 705/40 |
| 2007/0249375 | A1* | 10/2007 | Zapata | H04W 12/02 455/466 |
| 2008/0189550 | A1* | 8/2008 | Roundtree | G06F 21/51 713/176 |
| 2010/0250929 | A1* | 9/2010 | Schultz | H04L 63/083 713/168 |
| 2012/0264402 | A1* | 10/2012 | Zhang | H04L 63/0815 455/411 |
| 2013/0297425 | A1 | 11/2013 | Wallaja | |
| 2014/0359298 | A1* | 12/2014 | Carlson | H04L 63/123 713/176 |
| 2015/0281926 | A1* | 10/2015 | Liu | H04M 3/42 455/558 |
| 2016/0105540 | A1* | 4/2016 | Kwon | H04N 21/41407 715/747 |
| 2018/0146363 | A1* | 5/2018 | Liu | H04L 63/0853 |

FOREIGN PATENT DOCUMENTS

| | | |
|---|---|---|
| CN | 104079581 A | 10/2014 |
| CN | 105072112 A | 11/2015 |
| CN | 105450416 A | 3/2016 |
| CN | 105554037 A | 5/2016 |
| CN | 105827577 A | 8/2016 |
| CN | 105992204 A | 10/2016 |

OTHER PUBLICATIONS

Extended European search report of European Patent Application No. 17202869.8, from the European Patent office, dated Jan. 18, 2018.

First Office Action issued in corresponding Chinese Application No. 201611042990.0 dated Sep. 28, 2017.

* cited by examiner

IDENTITY VERIFICATION METHOD AND APPARATUS, AND STORAGE MEDIUM

CROSS REFERENCE TO RELATED ARTS

This application is based on and claims the priority of the Chinese patent application No. 201611042990.0, filed on Nov. 21, 2016, which is incorporated herein by reference in its entirety.

TECHNICAL FIELD

The present disclosure is related to the field of information technology, and more particularly to an identity verification method, apparatus and system, and a storage medium.

BACKGROUND

Identity verification, which is also known as "identity authentication" or "identity recognition", refers to a process of determining an identity of an operator in a computer or a computer network system. Through identity verification, it can be determined whether a user has right to access or use certain kind of resource, thereby enabling an access policy for the computer and network system to be carried out reliably and effectively, preventing an attacker from personating an authorized user to have access to the resources, ensuring security of the system and data, and endowing a visitor with authorized rights and interests.

With the popularization of mobile phones, mobile phone numbers have become a very important identity verification identification for mobile phone users. For example, in the related art, in case online banking service has been provisioned, identity verification is needed to be performed by comparison with a mobile phone number left in advance to the bank, when logging in a mobile bank. As another example, for identity verification, various network accounts are bound with a mobile phone number. Afterwards, when the network accounts are logged in on another terminal device, identity verification is performed by means of short message verification codes.

However, it is cumbersome for a user to receive and input a verification code each time identity verification is performed.

SUMMARY

To solve the problem in the related art, the present disclosure provides an identity verification method, apparatus and system, and a storage medium, whereby operations for identity verification can be simplified.

According to a first aspect of the disclosure, there is provided an identity verification method, comprising: receiving an identity verification instruction from a server; in response to the identity verification instruction, determining local hardware information of local hardware and first pre-stored mobile phone number information, wherein the first pre-stored mobile phone number information is mobile phone number information pre-stored locally; sending, to the server, the local hardware information and the first pre-stored mobile phone number information as identity information to be verified; and receiving a verification result generated by the server based on the identity information to be verified.

According to a second aspect of the disclosure, there is provided an identity verification apparatus, comprising: a processor, and a memory storing instructions executable by the processor. The processor is configured to: receive an identity verification instruction from a server; in response to the identity verification instruction, determine local hardware information of local hardware and first pre-stored mobile phone number information, wherein the first pre-stored mobile phone number information is mobile phone number information pre-stored locally; send, to the server, the local hardware information and the first pre-stored mobile phone number information as identity information to be verified; and receive a verification result generated by the server based on the identity information to be verified.

According to a third aspect of the disclosure, there is provided a non-transitory computer-readable storage medium having stored therein instructions that, when executed by a processor of a mobile terminal, cause the mobile terminal to perform an identity verification method, the method comprising: receiving an identity verification instruction from a server; in response to the identity verification instruction, determining local hardware information of local hardware and first pre-stored mobile phone number information, wherein the first pre-stored mobile phone number information is mobile phone number information pre-stored locally; sending, to the server, the local hardware information and the first pre-stored mobile phone number information as identity information to be verified; and receiving a verification result generated by the server based on the identity information to be verified.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

Figure 1A:
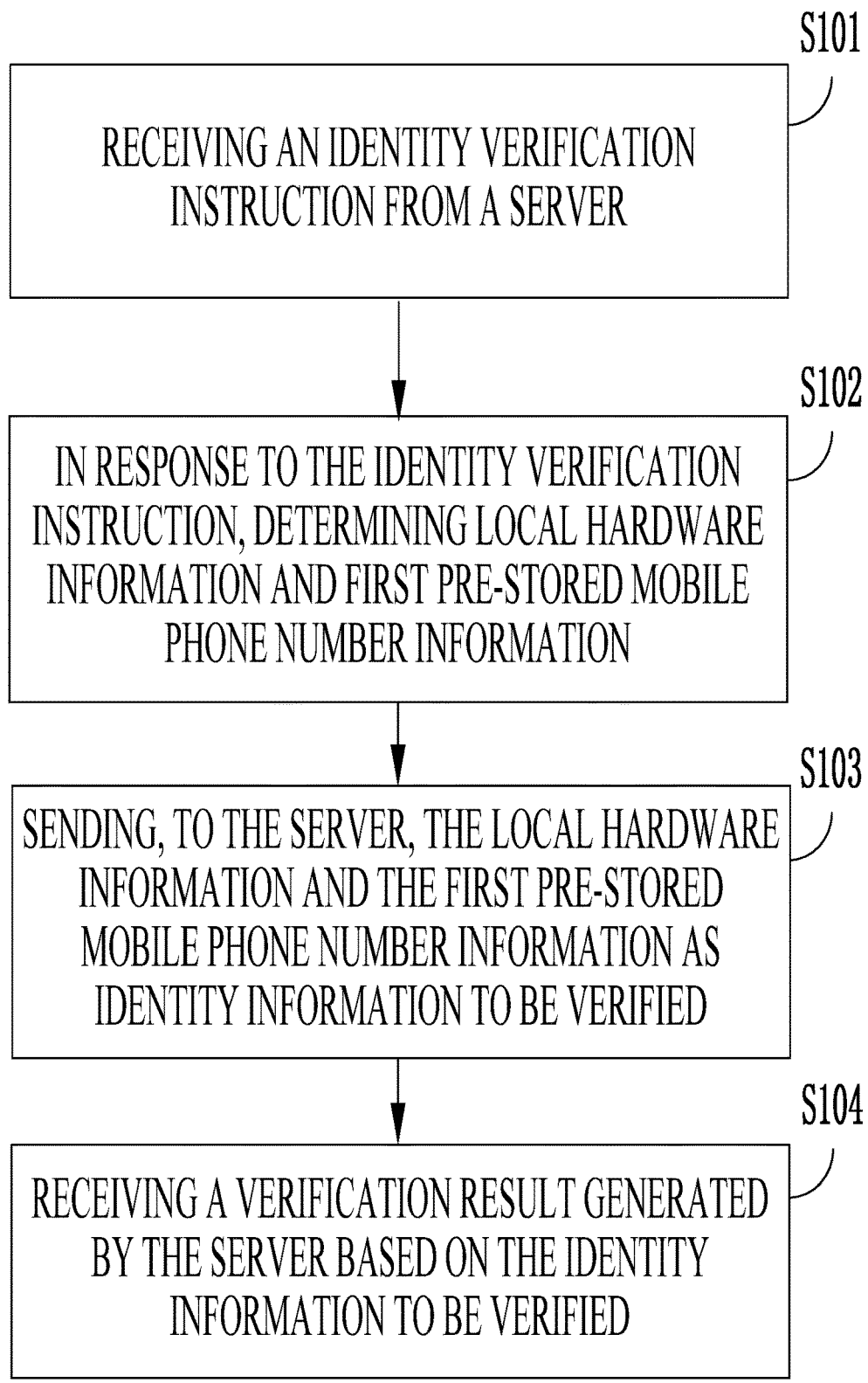
FIG. 1A is a flowchart of an identity verification method according to an exemplary embodiment.
Figure 1B:
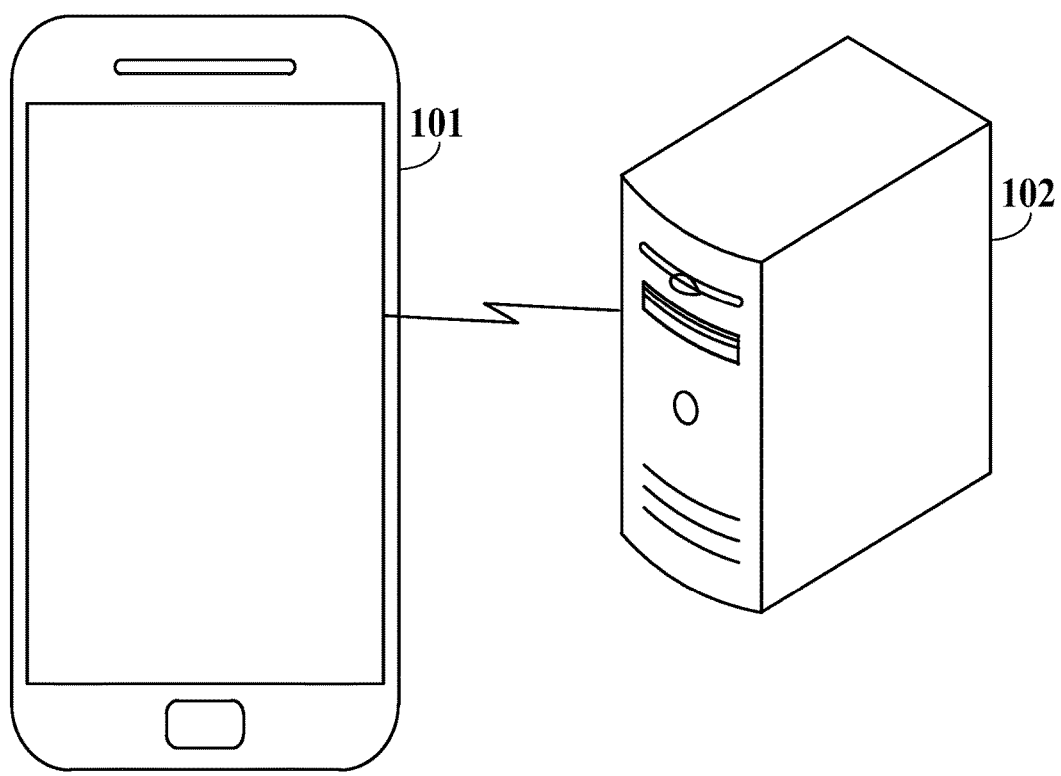
FIG. 1B is a schematic diagram illustrating an application scenario of an identity verification method according to an exemplary embodiment.
Figure 1C:
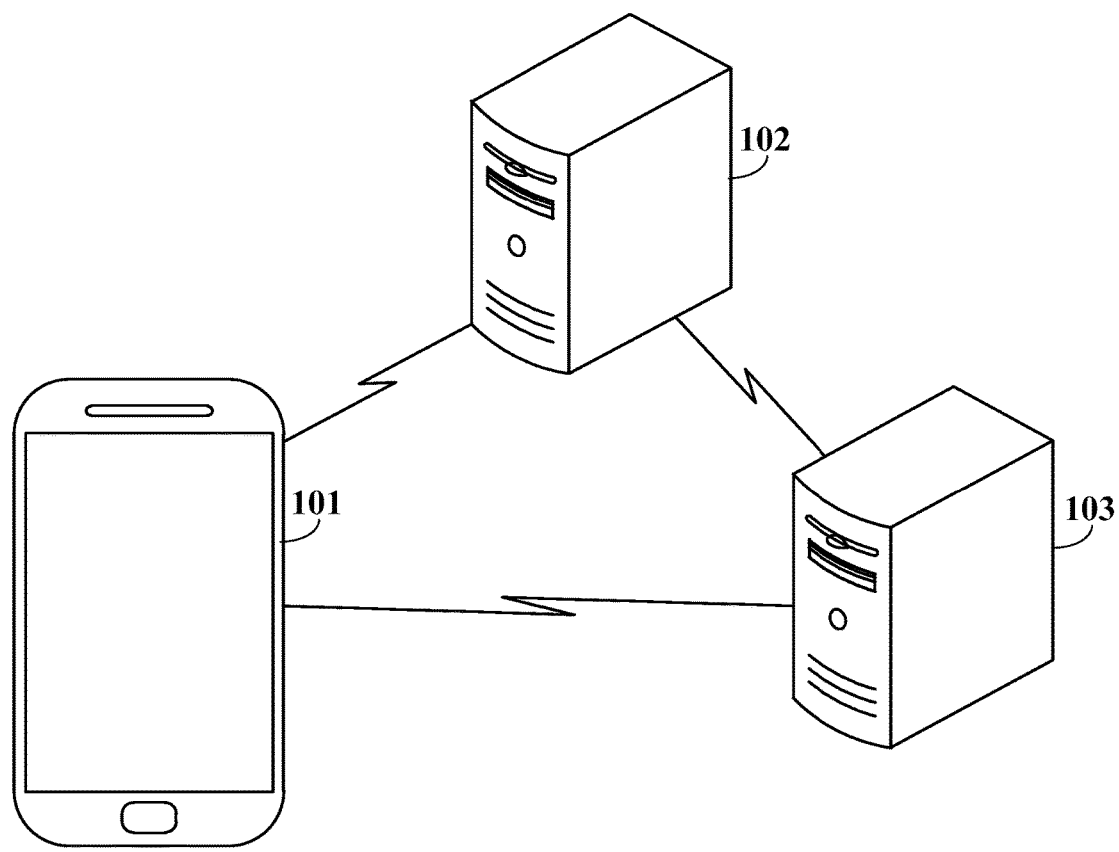
FIG. 1C is a schematic diagram of an application scenario of an identity verification method according to another exemplary embodiment.

FIG. 1A is a flowchart of an identity verification method according to an exemplary embodiment. FIG. 1B is a schematic diagram illustrating an application scenario of the identity verification method according to an exemplary embodiment. FIG. 1C is a schematic diagram illustrating an application scenario of the identity verification method according to another exemplary embodiment. The identity verification method may be implemented in a terminal device (for example, a smart phone, a tablet computer or the like) so as to simplify operations for identity verification. As shown in FIG. 1A, the identity verification method comprises the following steps S101-S104.

At step S101, an identity verification instruction is received from a server. The identity verification instruction may be an invisible instruction that is invisible to a user.

At step S102, in response to the identity verification instruction, local hardware information of local hardware and first pre-stored mobile phone number information are determined. The first pre-stored mobile phone number information is mobile phone number information pre-stored locally.

In an embodiment, the local hardware includes the terminal device and its hardware accessories. For example, in an embodiment, the terminal device may be a mobile phone, and the local hardware may include the mobile phone and a Subscriber Identity Module (SIM) card.

At step S103, the local hardware information and the first pre-stored mobile phone number information are sent to the server, as identity information to be verified.

At step S104, a verification result generated by the server based on the identity information to be verified is received.

In an embodiment, the server performs identity verification by comparing the identity information to be verified and pre-stored identity information, so as to generate a verification result. The pre-stored identity information includes second pre-stored mobile phone number information and pre-stored information of the local hardware. The second pre-stored mobile phone number information is mobile phone number information pre-stored by the server. When the identity information to be verified matches with the pre-stored identity information, the verification succeeds. When the identity information to be verified does not match with the pre-stored identity information, the verification fails.

In an exemplary scenario, as shown in FIG. 1B, when a user needs to log in or access a server 102 via a mobile phone 101, the server 102 sends an identity verification instruction to the mobile phone 101. At the mobile phone 101, the identity verification instruction is not visible to the user. For example, the identity verification instruction may not be shown in a display of the mobile phone 101, or may not change a user interface of the mobile phone 101. That is, the identity verification instruction can be executed in background for the mobile phone 101. When receiving the identity verification instruction, the mobile phone 101 directly acquires local hardware information of its local hardware and first pre-stored mobile phone number information without requiring the user to input any identity verification information, and sends the local hardware information and the first pre-stored mobile phone number information to the server 102 as identity information to be verified. The server 102 generates a verification result by comparing the identity information to be verified and pre-stored identity information. Based on the verification result, the server 102 decides whether to allow the mobile phone 101 to log in or access. When the identity information to be verified matches with the pre-stored identity information, the verification succeeds and the mobile phone 101 is allowed to log in or access the server 102. When the identity information to be verified does not match with the pre-stored identity information, the verification fails and the mobile phone 101 is not allowed to log in or access the server 102.

In another exemplary scenario, as shown in FIG. 1C, when a user needs to log in or access a server 102 via a mobile phone 101, the server 102 instructs a server 103 of an authorized third-party identity verification platform to send an identity verification instruction to the mobile phone 101. At the mobile phone 101, the identity verification instruction is not visible to the user. When receiving the identity verification instruction, the mobile phone 101 directly acquires local hardware information of its local hardware and first pre-stored mobile phone number information without requiring the user to input identity verification information, and sends the local hardware information and the first pre-stored mobile phone number information to the server 103 as identity information to be verified. The server 103 generates a verification result by comparing the identity information to be verified and pre-stored identity information, and feeds the verification result back to the server 102. Based on the verification result, the server 102 decides whether to allow the mobile phone 101 to log in or access. When the identity information to be verified matches with the pre-stored identity information, the verification succeeds and the server 102 allows the mobile phone 101 to log in or access. When the identity information to be verified does not match with the pre-stored identity information, the verification fails and the server 102 disallows the mobile phone 101 to log in or access.

In the embodiment, when an identity verification instruction is received, local hardware information and locally pre-stored mobile phone number information are directly acquired and combined into identity information to be verified, and the identity information is either sent to a server for identity verification or locally verified. The entire verification process is performed in background without requiring any user operation, thereby simplifying operations for identity verification.

In an embodiment, the identity verification method may further comprise: sending a short message to the server, the short message carrying information of a mobile phone number; receiving the mobile phone number from the server; and saving the mobile phone number as the first pre-stored mobile phone number information.

In an embodiment, the identity verification method may further comprise: sending a short message to the server, the short message carrying information of a mobile phone number; receiving a first hash value from the server, the first hash value being a hash value of the mobile phone number; and saving the first hash value as the first pre-stored mobile phone information.

In an embodiment, the identity verification method may further comprise: sending current local hardware information to the server. Receiving the verification result generated by the server based on the identity information to be verified comprises: receiving, from the server, a verification result generated based on the identity information to be verified and pre-stored identity information. The pre-stored identity information includes second pre-stored mobile phone number information and the current local hardware information, and the second pre-stored mobile phone number information is the mobile phone number determined based on the short message at the server.

In an embodiment, sending, to the server, the local hardware information and the first pre-stored mobile phone number information as the identity information to be verified may comprise: calculating a second hash value as the identity information to be verified, based on the local hardware information and the first pre-stored mobile phone number information; and sending the identity information to be verified to the server.

In an embodiment, the local hardware may include a mobile phone device and a SIM card. The local hardware information includes identification information of the mobile phone device and identification information and state information of the SIM card, and the state of the SIM card includes a state with network access permit and a state without network access permit.

In an embodiment, the identification information of the SIM card includes at least one of an Integrate Circuit Card IDentity (ICCID) and an International Mobile Subscriber Identification number (IMSI).

For details as to how to perform identity verification, reference can be made to the following embodiment.

According to the above-described method provided by the embodiment of the disclosure, when an identity verification instruction is received, local hardware information and a locally pre-stored mobile phone number are directly acquired and combined into identity information to be verified, and the identity information is sent to a server for identity verification. The entire verification process is performed in background without requiring any user operation, thereby simplifying operations for identity verification.

In the following, the technical solution provided by the embodiment of the disclosure will be described with reference to a specific embodiment.

Figure 2A:
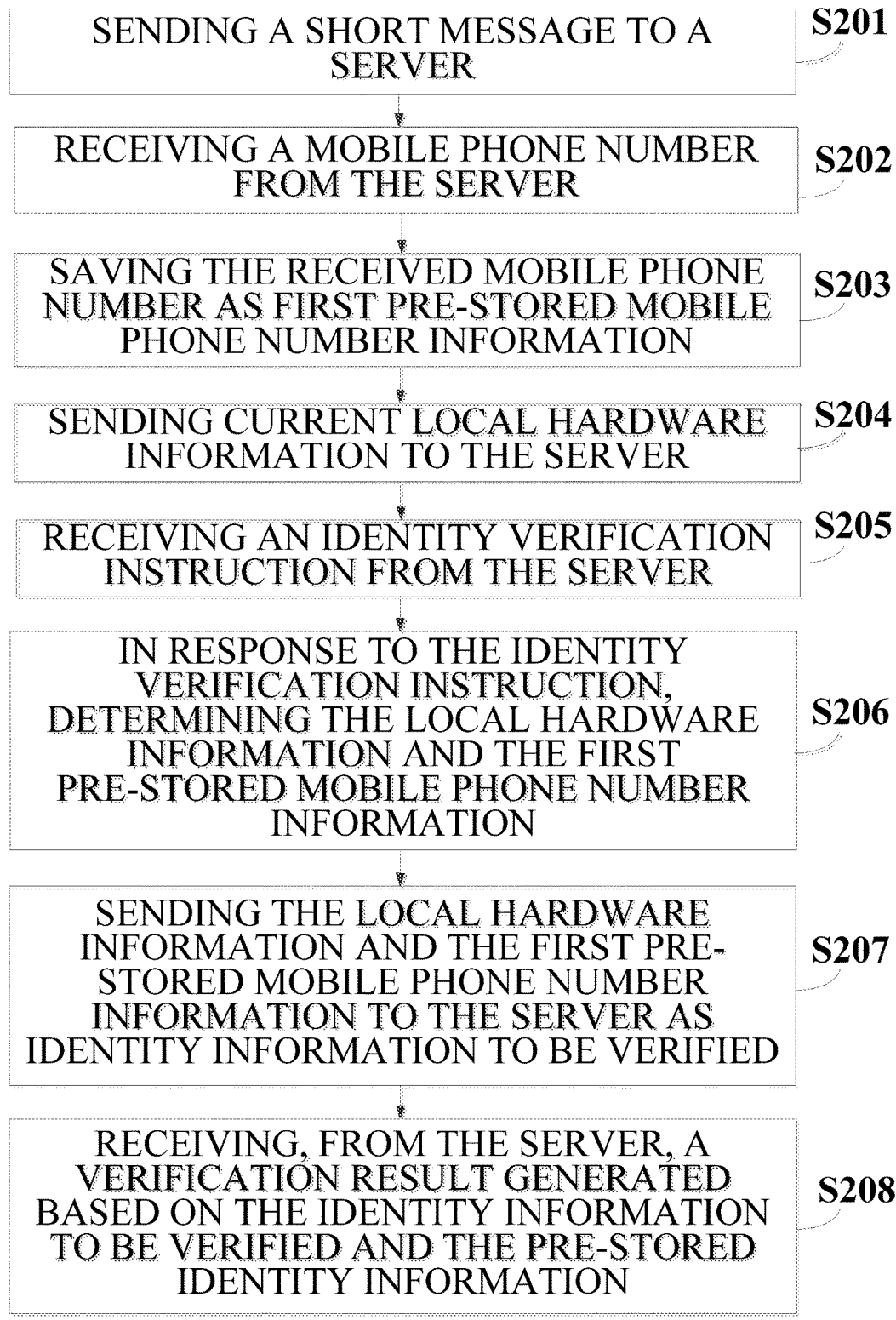
FIG. 2A is a flowchart of an identity verification method according to an exemplary embodiment.
Figure 2B:
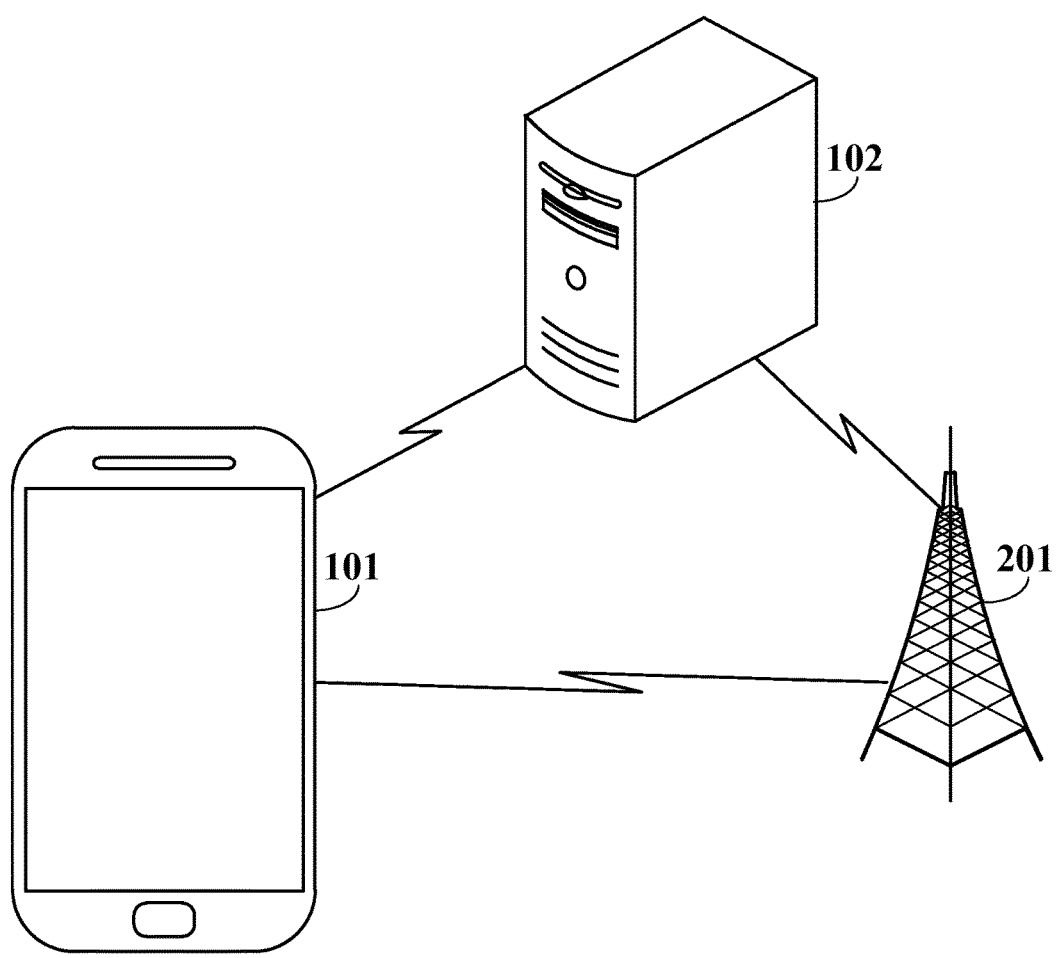
FIG. 2B is a schematic diagram of an application scenario of an identity verification method according to another exemplary embodiment.

FIG. 2A is a flowchart of an identity verification method according to an exemplary embodiment. FIG. 2B is s schematic diagram illustrating an application scenario of an identity verification method according to an exemplary embodiment. This embodiment is based on the above-described method according to the embodiment of the disclosure, and is illustratively described by taking an example where a mobile phone number is sent in plain text. As shown in FIG. 2A, the identity verification method comprises the following steps.

At step S201, a short message is sent to a server. The short message carries information of a mobile phone number.

At step S202, the mobile phone number is received from the server. In an embodiment, the mobile phone number from the server is a mobile phone number of a user determined by the server based on the short message.

At step S203, the received mobile phone number is saved as first pre-stored mobile phone number information.

At step S204, current local hardware information is sent to the server. The received current local hardware information is taken by the server as pre-stored information on the local hardware.

At step S205, an identity verification instruction is received from the server.

At step S206, in response to the identity verification instruction, the local hardware information and the first pre-stored mobile phone number information are determined.

At step S207, the local hardware information and the first pre-stored mobile phone number information are sent to the server as identity information to be verified.

At step S208, a verification result generated based on the identity information to be verified and pre-stored identity information is received from the server. The pre-stored identity information includes second pre-stored mobile phone number information and the received current local hardware information. The second pre-stored mobile phone number information is the mobile phone number determined based on the short message at the server.

In an embodiment, the short message may be sent to the server by a mobile communication operator. From the received short message, the server can obtain a mobile phone number of a user sending the short message. In another embodiment, the content of the short message may be anything or blank.

In an embodiment, the local hardware may include a mobile phone device and a SIM card. The local hardware information includes identification information of the mobile phone device and identification information and state information of the SIM card, and the state of the SIM card includes a state with network access permit or a state without network access permit. For example, in an embodiment, the local hardware may include a mobile phone and a SIM card. The local hardware information includes identification information of the mobile phone and identity information and state information of the SIM card. In an embodiment, the identification information of the SIM card may include an Integrated Circuit Card IDentity (ICCID). In another embodiment, the identity information of the SIM card may include an International Mobile Subscriber Identity number (IMSI). In yet another embodiment, the identity information of the SIM card may include both the ICCID and the IMSI. When any item in the identity information to be verified does not match with the pre-stored identity information, the identity verification fails, thereby improving security of the identity verification.

In an embodiment, the local hardware information may be acquired by reading information of the local hardware.

Steps S201-S204 may be regarded as a process for a user to register identity information. In this process, the user may perform identity registration by means of a short message, so that no short message needs to be used any more in a subsequent identity verification process. When the user replaces the local hardware, he/she may register identity information again by means of another short message, i.e. update the identity information. After that, when identity verification is performed based on the updated identity information, no short message needs to be used any more for identity verification. As such, after each registration of identity information, no short message needs to be used any more for identity verification, thereby simplifying operations for identity verification and helping improve user experience.

In an exemplary scenario, as shown in FIG. 2B, when a user registers identity information, he/she may edit a short message using a mobile phone 101 and send the short message to a server 102 through a base station 201 of a mobile communication operator. After receiving the short message, the server 102 acquires a mobile phone number of the user and saves it as second pre-stored mobile phone number information. The server 102 sends the second pre-stored mobile phone number information to the mobile phone 101. The mobile phone 101 saves the mobile phone number from the server 102 as locally stored mobile phone number information, namely, first pre-stored mobile phone number information. The mobile phone 201 may send the current local hardware information to the server 102 over a 2G/3G/4G network or by WIFI. The server 102 uses the received the current local hardware information of the mobile phone 101 as pre-stored information about its local hardware, and saves the pre-stored information on the local hardware and the second pre-stored mobile phone number information as pre-stored identity information for identity verification. So far, the user has completed registration of identity information.

When the user needs to log in or access the server 102 via the mobile phone 101, the server 102 sends an identity verification instruction to the mobile phone 101. At the mobile phone 101, the identity verification instruction is not visible to the user. When receiving the identity verification instruction, the mobile phone 101 directly acquires local hardware information and the first pre-stored mobile phone number information without requiring the user to input identity verification information, and sends the local hardware information and the first pre-stored mobile phone number information to the server 102 as identity information to be verified. The server 102 performs identity verification by comparing the identity information to be verified and the pre-stored identity information. When the identity information to be verified matches with the pre-stored identity information, the verification succeeds and the mobile phone 101 is allowed to log in or access the server 102. When the identity information to be verified does not match with the pre-stored identity information, the verification fails and the mobile phone 101 is not allowed to log in or access the server 102.

In an exemplary embodiment, the identity information registered by the user includes: identification information of a mobile phone A, "AAAA"; identification information of a SIM card A, "AAAAAAAA"; state information of the SIM card, "network access permitted"; and a mobile phone number, "13333333333". The identity information pre-stored by the server includes: the identification information of the mobile phone A, "AAAA"; the identification information of the SIM card A, "AAAAAAAA"; the state information of the SIM card, "network access permitted"; and the mobile phone number, "13333333333". When the user changes his mobile phone (for example, the user begins to use a mobile phone B having "BBBB" as its identity information, the SIM card A is mounted in the mobile phone B and the state information of the SIM card A is network access permitted) but does not register identity information anew after changing the mobile phone. When the user performs identity verification, the identity information to be verified acquired by the server includes: the identification information of the mobile phone B, "BBBB"; the identification information of the SIM card A, "AAAAAAAA"; the state information of the SIM card, "network access permitted"; and the mobile phone number, "13333333333". The server finds by comparison that there is an inconsistency in terms of the identification information of the mobile phone and determines that the identity verification fails.

In another exemplary embodiment, identity information registered by a user 1 includes: identification information of a mobile phone A, "AAAA"; identification information of a SIM card A, "AAAAAAAA"; state information of the SIM card, "network access permitted"; and a mobile phone number, "13333333333". The identity information pre-stored by the server includes: the identification information of the mobile phone A, "AAAA"; the identification information of the SIM card A, "AAAAAAAA"; the state information of the SIM card, "network access permitted"; and the mobile phone number, "13333333333". When the mobile phone A of the user 1 is lost or stolen, the user 1 may report the loss of the mobile phone number 13333333333 to the mobile communication operator. The mobile communication operator may deregister the SIM card A, so that the SIM card A cannot access network even if it is mounted on the mobile phone A, namely, the network access state of the SIM card A is network access not permitted. When a user 2 uses the mobile phone A mounted with the SIM card A to perform identity verification, the identity information to be verified acquired by the server includes: the identification information of the mobile phone A, "AAAA"; the identification information of the SIM card A, "AAAAAAAA"; the state information of the SIM card, "network access permitted"; and the mobile phone number, "13333333333". The server finds by comparison that the there is an inconsistency in terms of the state information of the SIM card and determines that the identity verification fails, thereby improving security of the identity verification.

In the embodiments, when an identity verification instruction is received, local hardware information and a locally pre-stored mobile phone number are directly acquired and combined into identity information to be verified, and the identity information is sent to a server for identity verification. The entire verification process is performed in background without requiring any user operation, thereby simplifying operations for identity verification. Furthermore, by using the identification information of the mobile phone, the identification information and state information of the SIM card and the mobile phone number as the identity verification information, security of the identification verification can be improved.

Figure 3:
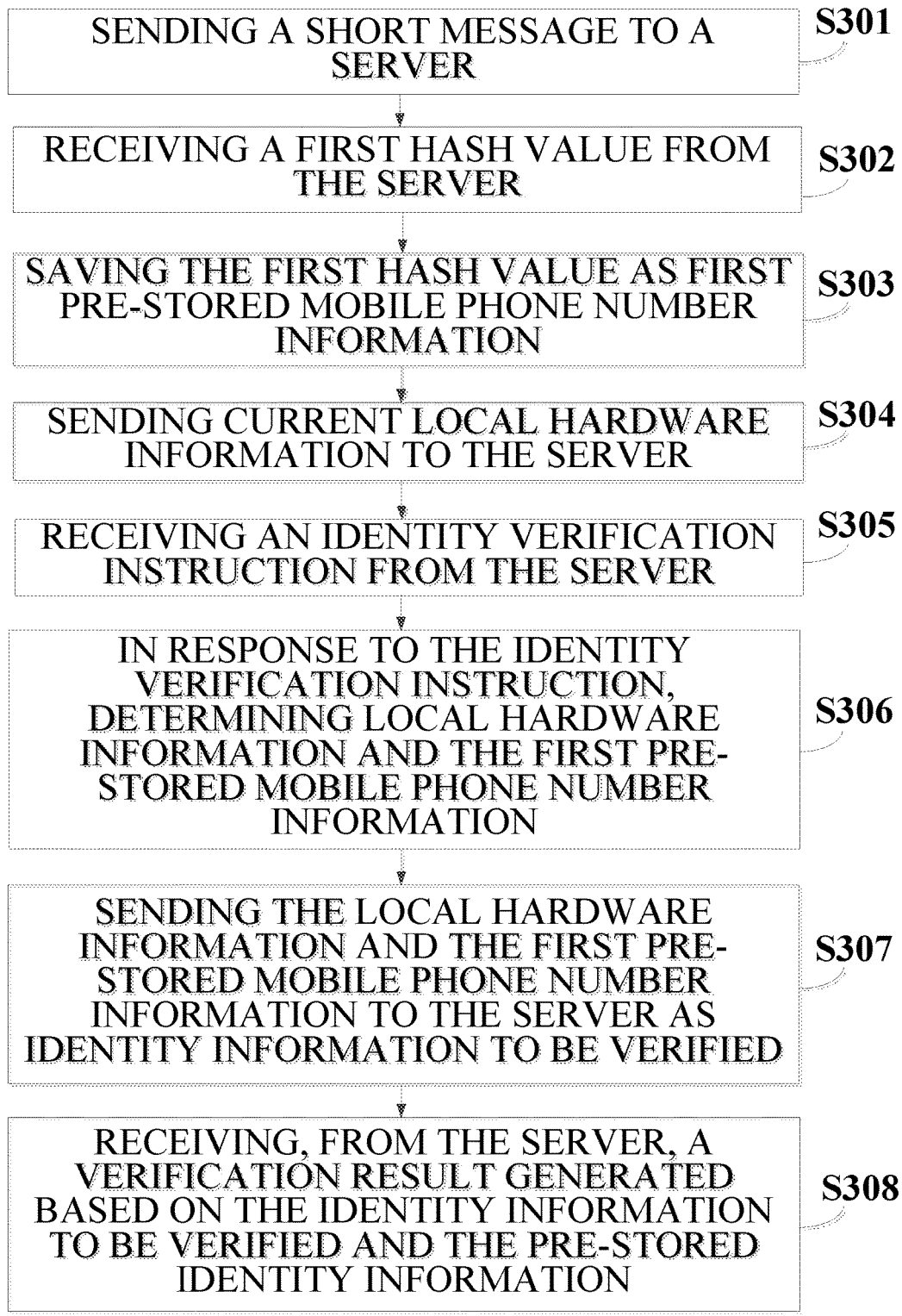
FIG. 3 is a flowchart of an identity verification method according to an exemplary embodiment.

FIG. 3 is a flowchart of an identity verification method according to an exemplary embodiment. This embodiment is based on the above-described method according to the embodiment of the disclosure, and is illustratively described by taking an example where a mobile phone number is sent in an encrypted form. As shown in FIG. 3, the identity verification method comprises the following steps.

At step S301, a short message is sent to a server. The short message carries information of a mobile phone number.

At step S302, a first hash value is received from the server.

At step S303, the first hash value is saved as first pre-stored mobile phone number information.

At step S304, current local hardware information is sent to the server. The received current local hardware information about the local hardware is taken by the server as pre-stored information on the local hardware.

At step S305, an identity verification instruction is received from the server.

At step S306, in response to the identity verification instruction, the local hardware information and the first pre-stored mobile phone number information are determined.

At step S307, the local hardware information and the first pre-stored mobile phone number information are sent to the server as identity information to be verified.

At step S308, a verification result generated based on the identity information to be verified and pre-stored identity information is received from the server. The pre-stored identity information includes second pre-stored mobile phone number information and the received current local hardware information. The second pre-stored mobile phone number information is the mobile phone number determined based on the short message at the server.

In the embodiment, when an identity verification instruction is received, local hardware information and a locally pre-stored mobile phone number are directly acquired and combined into identity information to be verified, and the identity information is sent to a server for identity verification. The entire verification process is performed in background without requiring any user operation, thereby simplifying operations for identity verification. Furthermore, it is very unlikely to derive the user's mobile phone number from the first hash value. Accordingly, on one hand, by transmitting the mobile phone number in the form of a hash value, security of information transmission can be improved and the amount of data to be transmitted may be reduced; on the other hand, by locally storing the mobile phone number in the form of a hash value, information security can also be improved.

Figure 4:
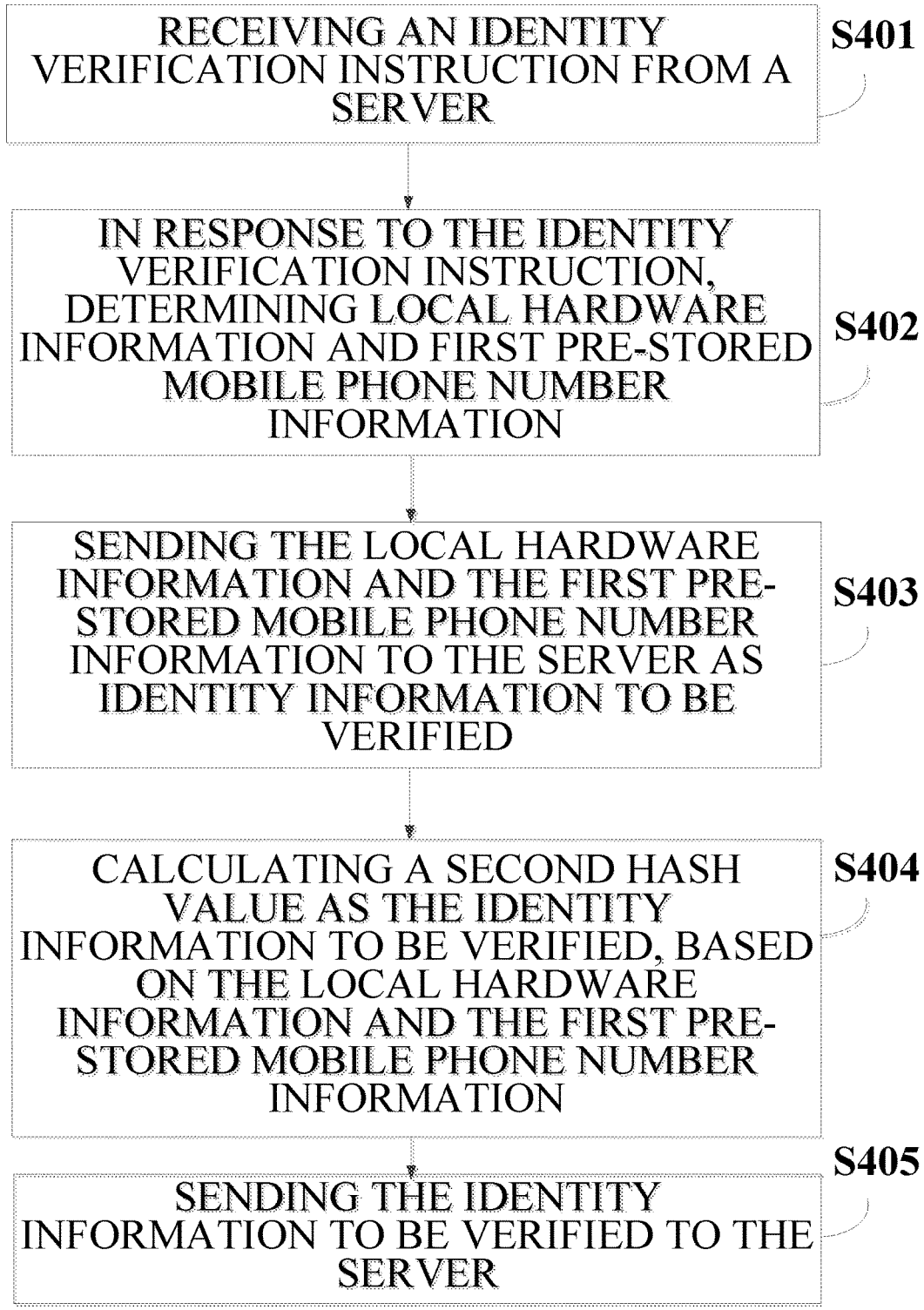
FIG. 4 is a flowchart of an identity verification method according to an exemplary embodiment.

FIG. 4 is a flowchart of an identity verification method according to an exemplary embodiment. This embodiment is based on the above-described method according to the embodiment of the disclosure, and is illustratively described by taking an example where identity information to be verified is sent to a server in an encrypted form. As shown in FIG. 4, the identity verification method comprises the following steps.

At step S401, an identity verification instruction is received from the server.

At step S402, in response to the identity verification instruction, local hardware information and first pre-stored mobile phone number information are determined. The first pre-stored mobile phone number information is mobile phone number information pre-stored locally.

At step S403, the local hardware information and the first pre-stored mobile phone number information are sent to the server as identity information to be verified.

At step S404, a second hash value is calculated as the identity information to be verified, based on the local hardware information and the first pre-stored mobile phone number information.

At step S405, the identity information to be verified is sent to the server. The server can derive a third hash value from pre-stored identity information and perform identity verification by comparing the second hash value with the third hash value.

In the embodiment, when an identity verification instruction is received, local hardware information and a locally pre-stored mobile phone number are directly acquired and combined into identity information to be verified, and the identity information is sent to a server for identity verification. The entire verification process is performed in background without requiring any user operation, thereby simplifying operations for identity verification. Furthermore, by using a second hash value, which is obtained by performing encryption calculation on the local hardware information and the first pre-stored mobile phone number, as the identity information to be verified, security of information transmission can be improved. Accordingly, security of identity verification can be improved and the amount of data to be transmitted may be reduced.

Figure 5:
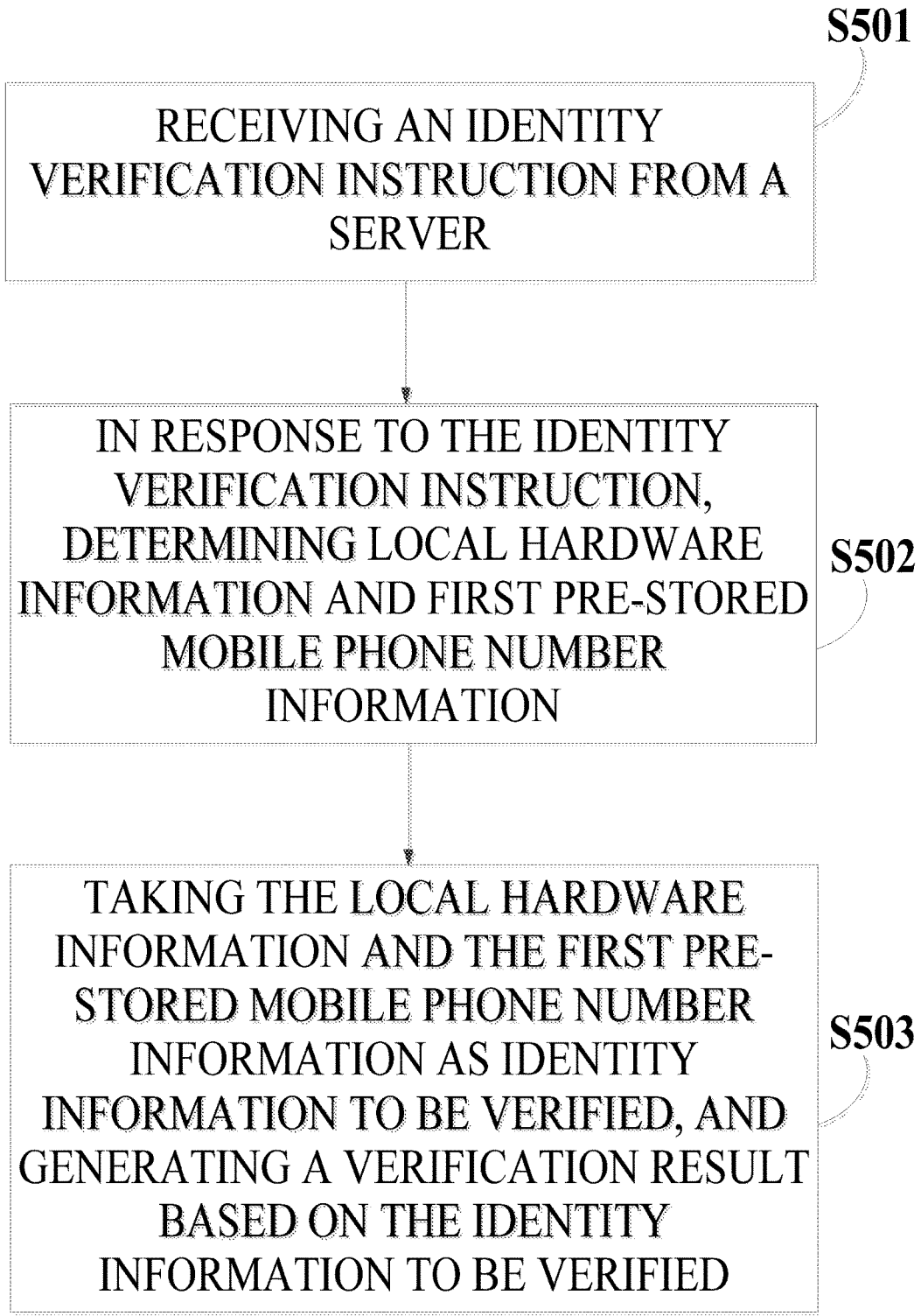
FIG. 5 is a flowchart of an identity verification method according to an exemplary embodiment.

FIG. 5 is a flowchart of an identity verification method according to an exemplary embodiment. The identity verification method may be implemented in a terminal device (for example, a smart phone, a tablet computer or the like) so as to simplify operations for identity verification. As shown in FIG. 5, the identity verification method comprises the following steps S501-S503.

At step S501, an identity verification instruction is received from a server. In an embodiment, the identity verification instruction is an invisible instruction.

At step S502, in response to the identity verification instruction, local hardware information and first pre-stored mobile phone number information are determined. The first pre-stored mobile phone number information is mobile phone number information pre-stored locally.

In an embodiment, the local hardware includes the terminal device and its hardware accessories. For example, in an embodiment, the terminal device may be a mobile phone, and the local hardware may include the mobile phone and a Subscriber Identity Module (SIM) card.

At step S503, the local hardware information and the first pre-stored mobile phone number information are taken as identity information to be verified, and a verification result is generated based on the identity information to be verified.

In an embodiment, the local hardware information and the first pre-stored mobile phone number may be taken as identity information to be verified and compared with locally pre-stored identity information, to perform identity verification and generate a verification result. The pre-stored identity information includes second pre-stored mobile phone number information and locally pre-stored local hardware information. The second pre-stored mobile phone number is a mobile phone number from and pre-stored by the server. The locally pre-stored local hardware information is information about the local hardware from and pre-stored by the server. When the identity information to be verified matches with the pre-stored identity information, the verification succeeds. When the identity information to be verified does not match with the pre-stored identity information, the verification fails.

In an exemplary scenario, as shown in FIG. 1B, when a user needs to log in or access a server 102 via a mobile phone 101, the server 102 sends an identity verification instruction to the mobile phone 101. At the mobile phone 101, the identity verification instruction is not visible to the user. When receiving the identity verification instruction, the mobile phone 101 directly acquires local hardware information and first pre-stored mobile phone number information without requiring the user to input identity verification information, takes the local hardware information and the first pre-stored mobile phone number information as identity information to be verified, and compares the identity information to be verified with locally pre-stored identity information to perform identity verification and generate a verification result. Based on the verification result, the server 102 decides whether to allow the mobile phone 101 to log in or access. When the identity information to be verified matches with the pre-stored identity information, the verification succeeds and the mobile phone 101 is allowed to log in or access the server 102. When the identity information to be verified does not match with the pre-stored identity information, the verification fails and the mobile phone 101 is not allowed to log in or access the server 102.

In another exemplary scenario, as shown in FIG. 1C, when a user needs to log in or access a server 102 via a mobile phone 101, the server 102 instructs a server 103 of an authorized third-party identity verification platform to send an identity verification instruction to the mobile phone 101. At the mobile phone 101, the identity verification instruction is not visible to the user. When receiving the identity verification instruction, the mobile phone 101 directly acquires local hardware information and first pre-stored mobile phone number information without requiring the user to input identity verification information, takes the local hardware information and the first pre-stored mobile phone number information as identity information to be verified, and compares the identity information to be verified with locally pre-stored identity information to perform identity verification and generate a verification result. The server 103 feeds the verification result back to the server 102. Based on the verification result, the server 102 decides whether to allow the mobile phone 101 to log in or access. When the identity information to be verified matches with the pre-stored identity information, the verification succeeds and the server 102 allows the mobile phone 101 to log in or access. When the identity information to be verified does not match with the pre-stored identity information, the verification fails and the server 102 disallows the mobile phone 101 to log in or access.

In the embodiment, when an identity verification instruction is received, local hardware information and locally pre-stored mobile phone number information are directly acquired and combined into identity information to be verified, and the identity information to be verified is compared locally with pre-stored identity information for performing identity verification. The entire verification process is performed in background without requiring any user operation, thereby simplifying operations for identity verification. Furthermore, local verification of identity is conducive to reducing burden on the server, and improves speed and efficiency of identity verification.

In an embodiment, the identity verification method may further comprise: sending a short message to the server, the short message carrying information on a mobile phone number; receiving the mobile phone number from the server; saving the mobile phone number as the first pre-stored mobile phone number information and second pre-stored mobile phone number information; sending current local hardware information to the server; and receiving the current local hardware information from the server. Taking the local hardware information and the first pre-stored mobile phone number information as the identity information to be verified and generating the verification result based on the identity information to be verified comprises generating the verification result based on the identity information to be verified and pre-stored identity information, the pre-stored identity information including the second pre-stored mobile phone number information and the current local hardware information.

In an embodiment, the identity verification method may further comprise: sending a short message to the server, the short message carrying information of a mobile phone number; receiving a first hash value from the server, the first hash value being a hash value of the mobile phone number; saving the first hash value as the first pre-stored mobile phone number information and second pre-stored mobile phone number information; sending current local hardware information to the server; and receiving the current local hardware information from the server. Taking the local hardware information and the first pre-stored mobile phone number information as the identity information to be verified and generating the verification result based on the identity information to be verified comprises generating the verification result based on the identity information to be verified and pre-stored identity information, the pre-stored identity information including the second pre-stored mobile phone number information and the current local hardware information.

In an embodiment, the identity verification method may further comprise: calculating a second hash value based on the identity information to be verified; and calculating a third hash value based on the pre-stored identity information. Generating the verification result based on the identity information to be verified and the pre-stored identity information may comprise: generating the verification result based on the second hash value and the third hash value.

In an embodiment, the local hardware may include a mobile phone device and a SIM card. The local hardware information includes identification information of the mobile phone device and identification information and state information of the SIM card, and the state of the SIM card includes a state with network access permit and a state without network access permit.

In an embodiment, the identification information of the SIM card may include at least one of an Integrate Circuit Card IDentity (ICCID) and an International Mobile Subscriber Identification number (IMSI).

For details as to how to perform identity verification, reference can be made to the following embodiment.

According to the above-described method provided by the embodiment of the disclosure, when an identity verification instruction is received, local hardware information and locally pre-stored mobile phone number information are directly acquired and combined into identity information to be verified, and identity verification is performed locally. The entire verification process is performed in background without requiring any user operation, thereby simplifying operations for identity verification. Furthermore, local verification of identity favorably reduces burden on the server and improves speed and efficiency of identity verification.

Figure 6:
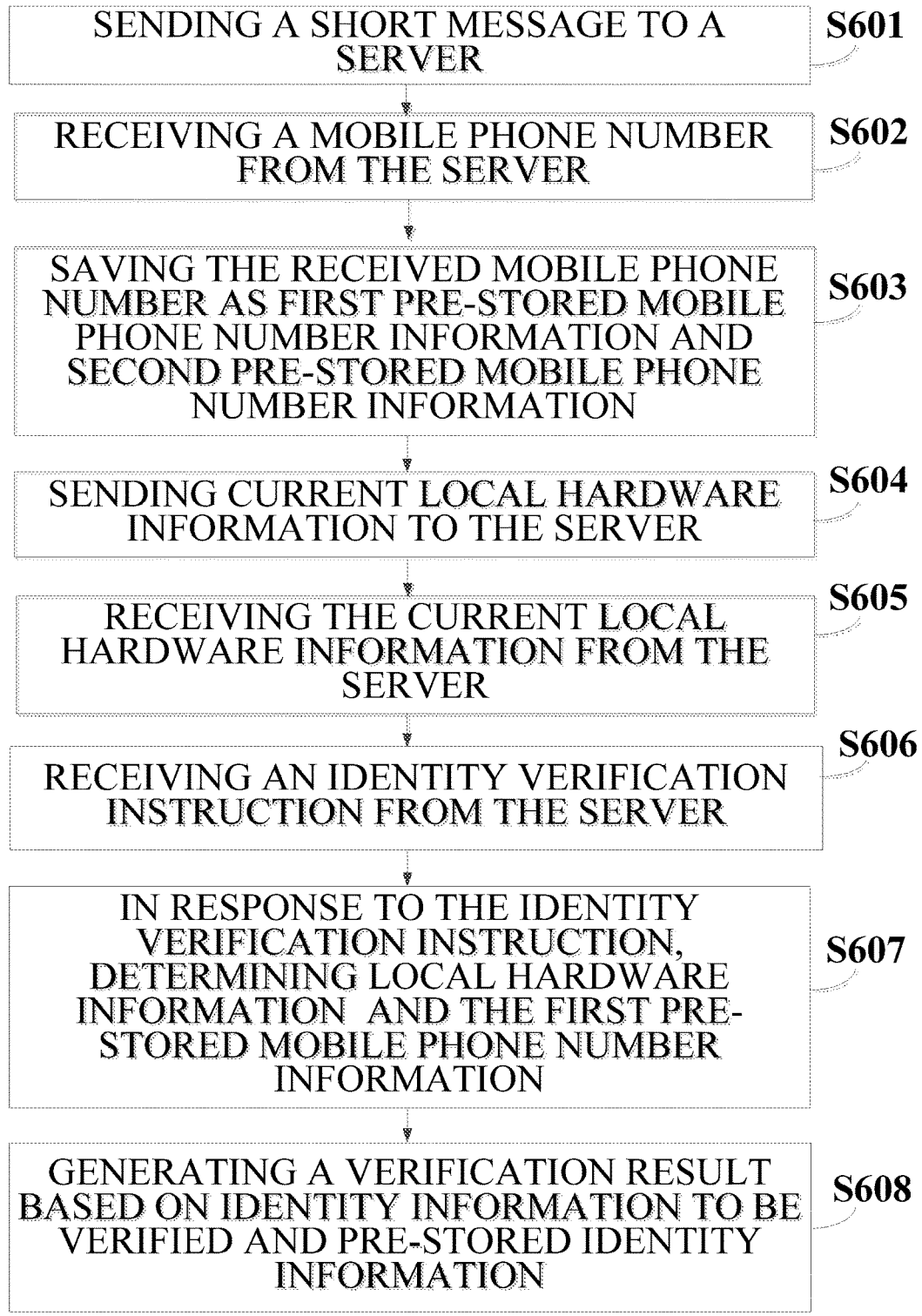
FIG. 6 is a flowchart of an identity verification method according to an exemplary embodiment.

FIG. 6 is a flowchart of an identity verification method according to an exemplary embodiment. This embodiment is based on the above-described method according to the embodiment of the disclosure, and is illustratively described by taking an example where a mobile phone number is sent in plain text. As shown in FIG. 6, the identity verification method comprises the following steps.

At step S601, a short message is sent to a server. The short message carries information of a mobile phone number, in order for the server to acquire, based on the short message, the mobile phone number as a mobile phone number pre-stored by the server.

At step S602, the mobile phone number is received from the server.

At step S603, the received mobile phone number is saved as first pre-stored mobile phone number information and second pre-stored mobile phone number information.

At step S604, current local hardware information is sent to the server. The server takes the received current local hardware information as local hardware information pre-stored by the server.

At step S605, the current local hardware information is received from the server.

At step S606, an identity verification instruction is received from the server.

At step S607, in response to the identity verification instruction, the local hardware information and the first pre-stored mobile phone number information are determined. The first pre-stored mobile phone number information is mobile phone number information pre-stored locally.

At step S608, a verification result is generated based on identity information to be verified and pre-stored identity information. The pre-stored identity information includes the second pre-stored mobile phone number information and the received current local hardware information.

In an embodiment, the short message may be sent to the server by a mobile communication operator. From the received short message, the server can obtain a mobile phone number of a user sending the short message. In another embodiment, the content of the short message may be anything or blank.

In an embodiment, the local hardware may include a mobile phone device and a SIM card. The local hardware information includes identification information of the mobile phone device and identification information and state information of the SIM card. The state of the SIM card includes a state with network access permit and a state without network access permit. For example, in an embodiment, the local hardware may include a mobile phone and a SIM card. The local hardware information includes identification information of the mobile phone and identity information and state information of the SIM card. In an embodiment, the identification information of the SIM card may include an Integrated Circuit Card IDentity (ICCID). In another embodiment, the identity information of the SIM card may include an International Mobile Subscriber Identity (IMSI). In yet another embodiment, the identity information of the SIM card may include both the ICCID and the IMSI. When any item in the identity information to be verified does not match with the pre-stored identity information, the identity verification fails, thereby improving security of the identity verification.

In an embodiment, the local hardware information may be acquired by reading the local hardware information.

Steps S601-S604 may be regarded as a process for a user to register identity information. In this process, the user may perform identity registration by means of a short message, so that no short message needs to be used any more in a subsequent identity verification process. When the user replaces the local hardware, he/she may register identity information again by means of another short message. After that, when identity verification is performed based on the updated identity information, no short message needs to be used any more for identity verification. As such, after each registration of identity information, no short message needs to be used any more for identity verification, thereby simplifying operations for identity verification operations and helping improve user experience.

In an exemplary scenario, as shown in FIG. 2B, a mobile phone 101 is a device authorized by a server 102. After passing identity verification of the mobile phone 101, a user can log in or access the server 102. The mobile phone 101 may verify identity information by itself. When the user registers identity information, he/she may edit a short message using the mobile phone 101 and send the short message to the server 102 through a base station 201 of a mobile communication operator. After receiving the short message, the server 102 acquires a mobile phone number of the user and saves it as mobile phone number information pre-stored by the server 102. The server 102 sends the mobile phone number pre-stored by the server 102 to the mobile phone 101. The mobile phone 101 saves the mobile phone number from and pre-stored by the server 102 as first pre-stored mobile phone number information and second pre-stored mobile phone number information. In identity verification, the first pre-stored mobile phone number information is part of identity information to be verified, and the second pre-stored mobile phone number information is part of locally pre-stored identity information.

The mobile phone 101 may send current information on the local hardware to the server 102 over a 2G/3G/4G network or by WIFI. The server 102 takes the received current information on the local hardware of the mobile phone 101 as information on the local hardware pre-stored by the server. As the mobile phone 101 is a device authorized by the server 102, the mobile phone 101 can also acquire the local hardware information pre-stored by the server as locally pre-stored information on the local hardware. The mobile phone 101 can use the second pre-stored mobile phone number information and the locally pre-stored information on the local hardware as locally pre-stored identity information for identity verification. So far, the user has completed registration of identity information.

When the user needs to log in or access the server 102 via the mobile phone 101, the server 102 sends an identity verification instruction to the mobile phone 101. At the mobile phone 101, the identity verification instruction is not visible to the user. When receiving the identity verification instruction, the mobile phone 101 directly acquires local hardware information and the first pre-stored mobile phone number information without requiring the user to input identity verification information, takes the local hardware information and the first pre-stored mobile phone number information as identity information to be verified, and compares the identity information to be verified with locally pre-stored identity information to perform identity verification. When the identity information to be verified matches with the locally pre-stored identity information, the verification succeeds and the mobile phone 101 is allowed to log in or access the server 102. When the identity information to be verified does not match with the pre-stored identity information, the verification fails and the mobile phone 101 is disallowed to log in or access the server 102.

In an exemplary embodiment, the identity information registered by the user includes: identification information of a mobile phone A, "AAAA"; identification information of a SIM card A, "AAAAAAAA"; state information of the SIM card, "network access permitted"; and a mobile phone number, "13333333333". The locally pre-stored identity information includes: the identification information of the mobile phone A, "AAAA"; the identification information of the SIM card A, "AAAAAAAA"; the state information of the SIM card, "network access permitted"; and the mobile phone number, "13333333333". When the user changes his mobile phone (for example, the user begins to use a mobile phone B having "BBBB" as its identity information, the SIM card A is mounted in the mobile phone B and the state information of the SIM card A is network access permitted)

but does not register identity information again after changing the mobile phone. When the user performs identity verification, the identity information to be verified acquired by the mobile phone B includes: the identification information of the mobile B, "BBBB"; the identification information of the SIM card A, "AAAAAAAA"; the state information of the SIM card, "network access permitted"; and the mobile phone number "13333333333". The mobile phone B finds by comparison that there is an inconsistency in terms of the identification information of the mobile phone and determines that the identity verification fails, thereby improving security of identity verification.

In another exemplary embodiment, identity information registered by a user 1 includes: identification information of a mobile phone A, "AAAA"; identification information of a SIM card A, "AAAAAAAA"; state information of the SIM card, "network access permitted"; and a mobile phone number, "13333333333". The identity information locally pre-stored by the mobile phone A includes: the identification information of the mobile phone A, "AAAA"; the identification information of the SIM card A, "AAAAAAAA"; the state information of the SIM card, "network access permitted"; and the mobile phone number, "13333333333". When the mobile phone A of the user 1 is lost or stolen, the user 1 may report the loss of the mobile phone number "13333333333" to the mobile communication operator. The mobile communication operator may deregister the SIM card A, so that the SIM card A cannot access network even if it is mounted on the mobile phone A, namely, the network access state of the SIM card A is network access not permitted. When a user 2 uses the mobile phone A mounted with the SIM card A to perform identity verification, the identity information to be verified acquired by the mobile phone A includes: the identification information of the mobile phone A, "AAAA"; the identification information of the SIM card A, "AAAAAAAA"; the state information of the SIM card, "network access permitted"; and the mobile phone number, "13333333333". The mobile phone A finds by comparison that the there is an inconsistency in terms of the state information of the SIM card and determines that the identity verification fails, thereby improving security of the identity verification.

In the embodiment, when an identity verification instruction is received, local hardware information and locally pre-stored mobile phone number information are directly acquired and combined into identity information to be verified, and identity verification is performed locally. The entire verification process is performed in background without requiring any user operation, thereby simplifying operations for identity verification. Furthermore, local verification of identity favorably reduces burden on the server and improves speed and efficiency of identity verification. Additionally, by using the identification information of the mobile phone, the identification information and state information of the SIM card and the mobile phone number as the identity verification information, security of the identification verification can be improved.

Figure 7:
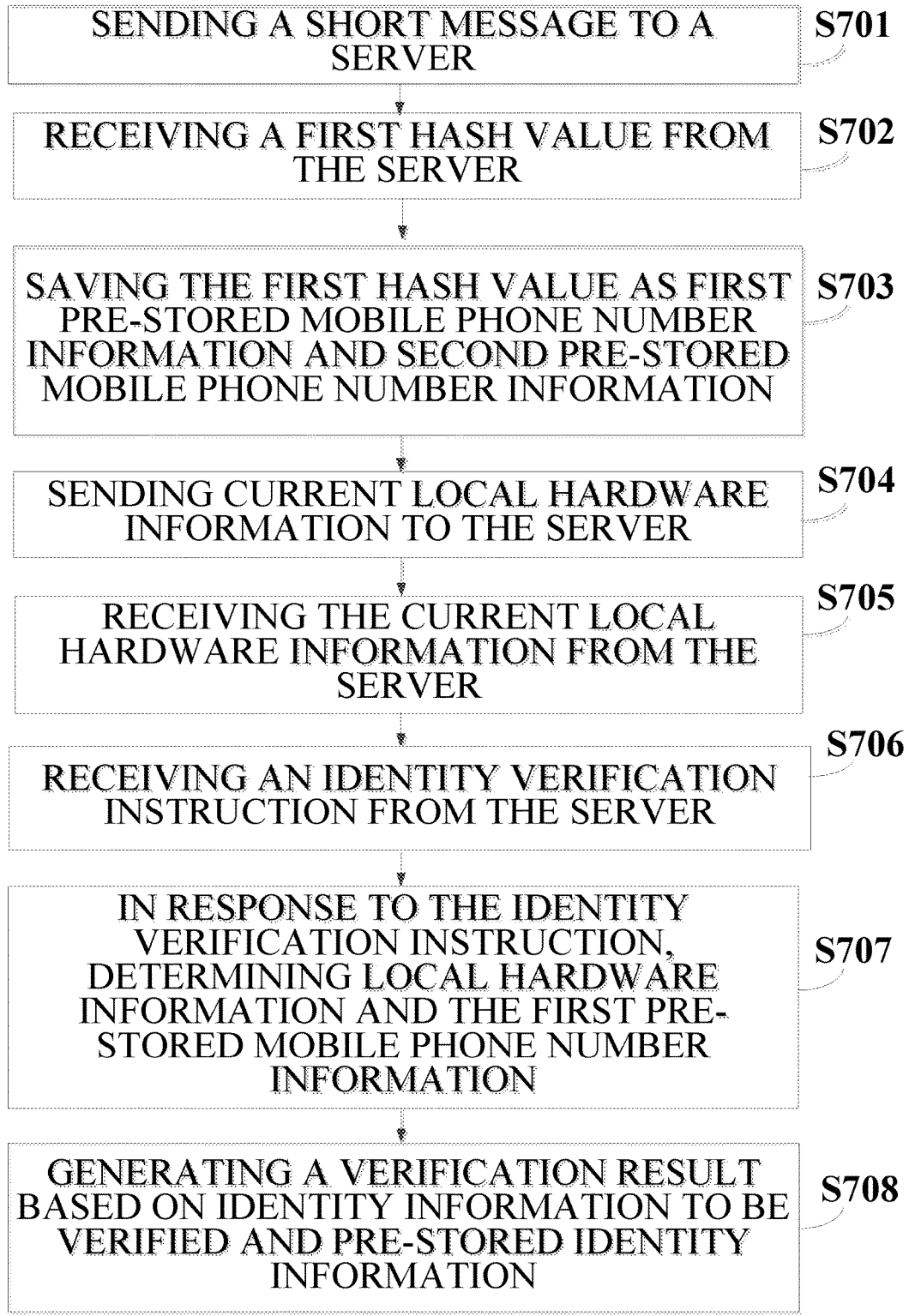
FIG. 7 is a flowchart of an identity verification method according to an exemplary embodiment.

FIG. 7 is a flowchart of an identity verification method according to an exemplary embodiment. This embodiment is based on the above-described method according to the embodiment of the disclosure, and is illustratively described by taking an example where a mobile phone number is sent in an encrypted form. As shown in FIG. 7, the identity verification method comprises the following steps.

At step S701, a short message is sent to a server. The short message carries information of a mobile phone number, in order for the server to acquire, based on the short message, the mobile phone number as a mobile phone number pre-stored by the server.

At step S702, a first hash value is received from the server. The first hash value is a hash value of the mobile phone number.

At step S703, the first hash value is saved as first pre-stored mobile phone number information and second pre-stored mobile phone number information.

At step S704, current local hardware information is sent to the server. The server takes the current local hardware information as the local hardware information pre-stored by the server.

At step S705, the current local hardware information is received from the server.

At step S706, an identity verification instruction is received from the server.

At step S707, in response to the identity verification instruction, the local hardware information and the first pre-stored mobile phone number information are determined. The first pre-stored mobile phone number information is mobile phone number information pre-stored locally.

At step S708, a verification result is generated based on identity information to be verified and pre-stored identity information. The pre-stored identity information includes the second pre-stored mobile phone number information and the received current local hardware information.

In the embodiment, when an identity verification instruction is received, the local hardware information and a locally pre-stored mobile phone number are directly acquired and combined into identity information to be verified, and identity verification is performed locally. The entire verification process is performed in background without requiring any user operation, thereby simplifying operations for identity verification. Furthermore, local verification of identity favorably reduces burden on the server and improves speed and efficiency of identity verification. Additionally, it is very unlikely to derive the user's mobile phone number from the first hash value. Accordingly, on one hand, by transmitting the mobile phone number in the form of a hash value, security of information transmission can be improved and the amount of data to be transmitted may be reduced; on the other hand, by locally storing the mobile phone number in the form of a hash value, information security can also be improved.

Figure 8:
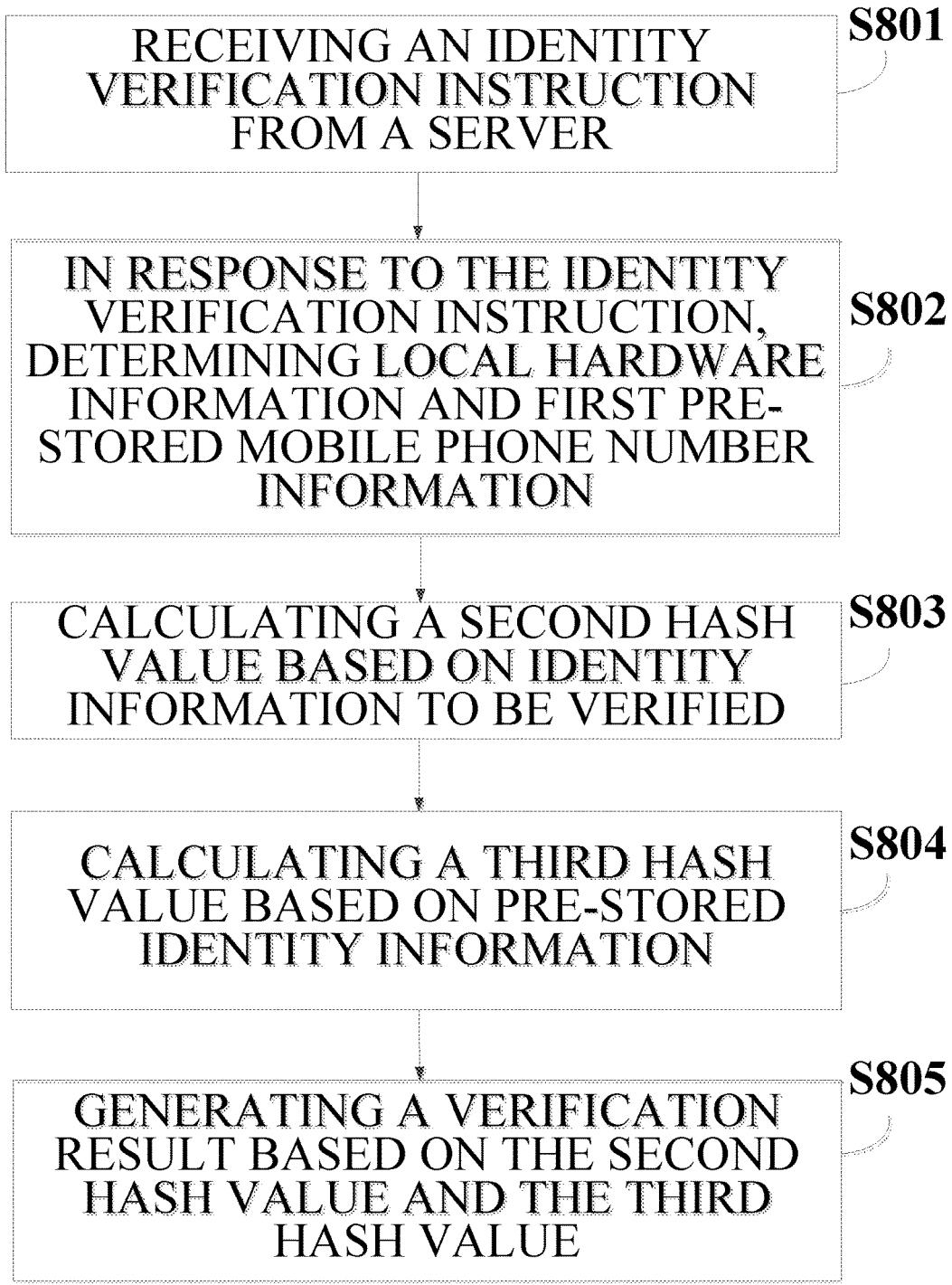
FIG. 8 is a flowchart of an identity verification method according to an exemplary embodiment.

FIG. 8 is a flowchart of an identity verification method according to an exemplary embodiment. This embodiment is based on the above-described method according to the embodiment of the disclosure, and is illustratively described by taking an example where identity information is saved in an encrypted form. As shown in FIG. 8, the identity verification method comprises the following steps.

At step S801, an identity verification instruction is received from a server.

At step S802, in response to the identity verification instruction, local hardware information and first pre-stored mobile phone number information are determined.

At step S803, a second hash value is calculated based on identity information to be verified. The identity information to be verified includes the local hardware information and the first pre-stored mobile phone number information.

At step S804, a third hash value is calculated based on pre-stored identity information. The pre-stored identity information includes second pre-stored mobile phone number information and the local hardware information pre-stored locally.

At step S805, a verification result is generated based on the second hash value and the third hash value.

In the embodiment, when an identity verification instruction is received, local hardware information and locally pre-stored mobile phone number information are directly acquired and combined into identity information to be verified, and identity verification is performed locally. The entire verification process is performed in background without requiring any user operation, thereby simplifying operations for identity verification. Furthermore, local verification of identity favorably reduces burden on the server and improves speed and efficiency of identity verification. Additionally, by using a second hash value, which is obtained by performing encryption calculation on the local hardware information and the first pre-stored mobile phone number, as the identity information to be verified and using the third hash value, which is obtained by performing encryption calculation on locally pre-stored identity information, as the locally pre-stored identity information, security of locally stored information can be improved, because it is very unlikely to derive the local hardware information and the first pre-stored mobile phone number information from the second hash value and to derive the locally pre-stored identity information from the third hash value. Accordingly, security of identity verification is improved and required data storage space may be reduced.

Figure 9:
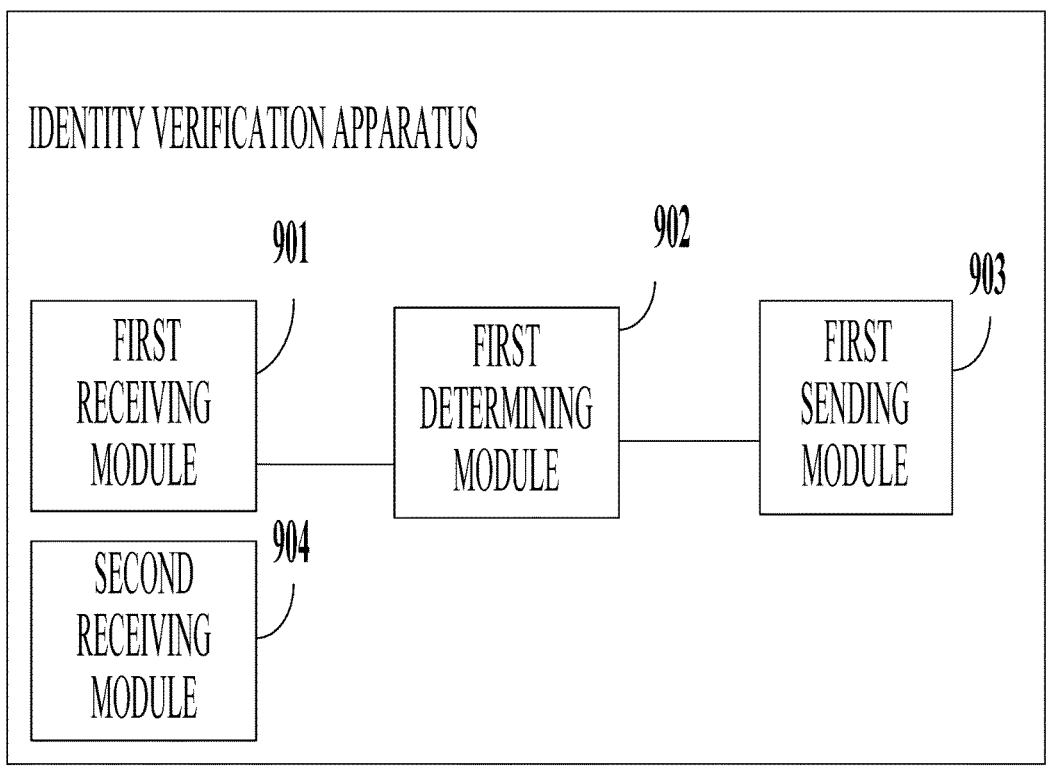
FIG. 9 is a block diagram of an identity verification apparatus according to an exemplary embodiment.

FIG. 9 is a block diagram of an identity verification apparatus according to an exemplary embodiment. As shown, the identity verification apparatus comprises the following modules 901-904.

The first receiving module 901 is configured to receive an identity verification instruction from a server.

The first determining module 902 is configured to, in response to the identity verification instruction, determine local hardware information of local hardware and first pre-stored mobile phone number information, wherein the first pre-stored mobile phone number information is mobile phone number information pre-stored locally.

The first sending module 903 is configured to send, to the server, the local hardware information and the first pre-stored mobile phone number information as identity information to be verified.

The second receiving module 904 is configured to receive a verification result generated by the server based on the identity information to be verified.

Figure 10:
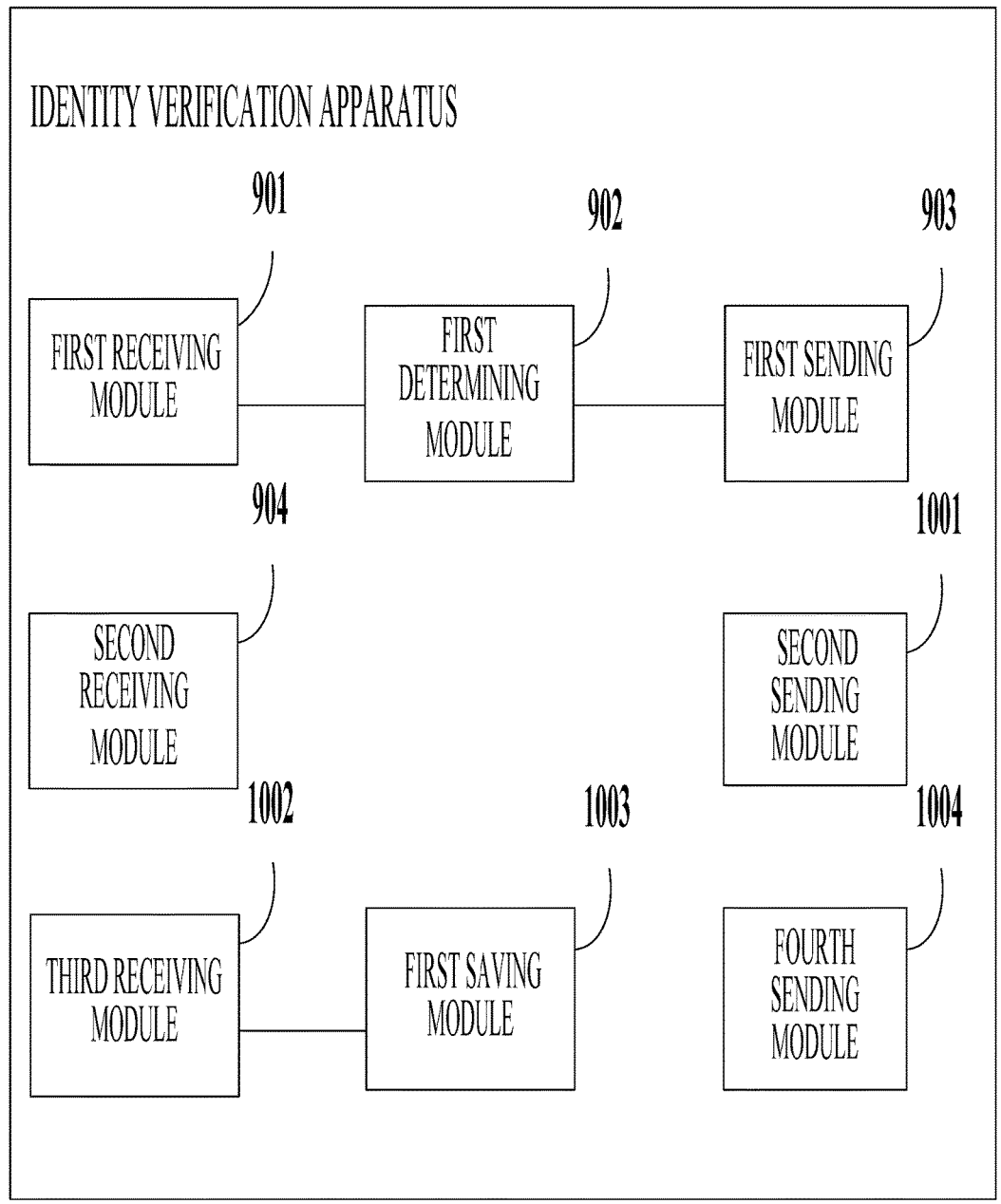
FIG. 10 is a block diagram of another identity verification apparatus according to an exemplary embodiment.

FIG. 10 is a block diagram of another identity verification apparatus according to an exemplary embodiment. As shown, further to the embodiment shown in FIG. 9, the identity verification apparatus in the embodiment may further comprise the following modules 1001-1004.

The second sending module 1001 is configured to send a short message to the server, the short message carrying information of a mobile phone number.

The third receiving module 1002 is configured to receive the mobile phone number from the server.

The first saving module 1003 is configured to save the mobile phone number as the first pre-stored mobile phone number information.

The fourth sending module 1004 is configured to send current local hardware information to the server.

The second receiving module 904 is configured to: receive, from the server, a verification result generated based on the identity information to be verified and pre-stored identity information, wherein the pre-stored identity information includes second pre-stored mobile phone number information and the current local hardware information, and the second pre-stored mobile phone number information is the mobile phone number determined based on the short message at the server.

In an embodiment, the local hardware may include a mobile phone device and a SIM card.

The local hardware information includes identification information of the mobile phone device and identification information and state information of the SIM card, and the state of the SIM card includes a state with network access permit and a state without network access permit.

In an embodiment, the identification information of the SIM card includes at least one of an Integrate Circuit Card IDentity (ICCID) and an International Mobile Subscriber Identification Number (IMSI).

Figure 11:
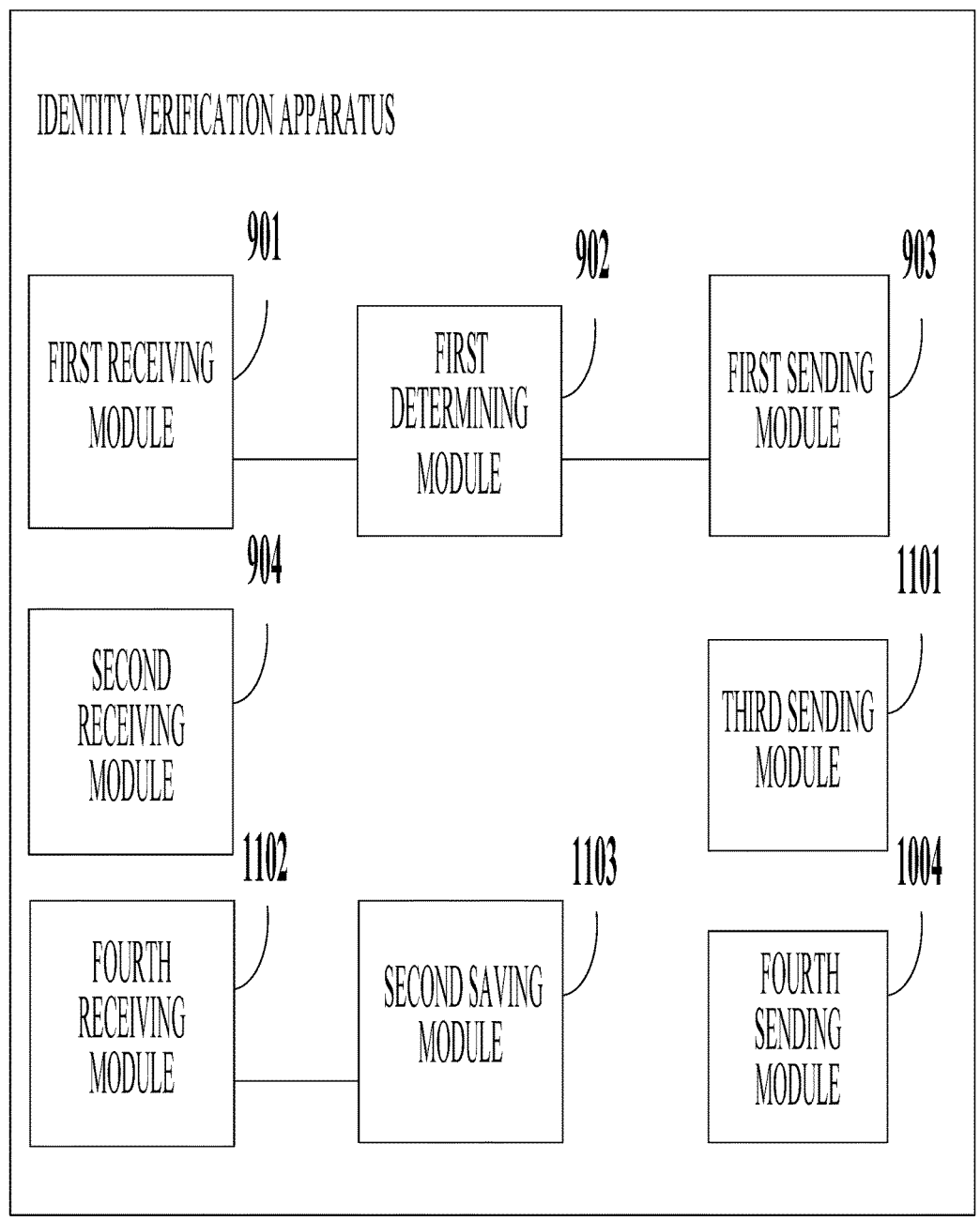
FIG. 11 is a block diagram of yet another identity verification apparatus according to an exemplary embodiment.

FIG. 11 is a block diagram of yet another identity verification apparatus according to an exemplary embodiment. As shown, further to the embodiment shown in FIG. 9, the identity verification apparatus in the embodiment may further comprise the following modules 1101-1103 and 1004.

The third sending module 1101 is configured to send a short message to the server, the short message carrying information of a mobile phone number.

The fourth receiving module 1102 is configured to receive a first hash value from the server, the first hash value being a hash value of the mobile phone number.

The second saving module 1103 is configured to save the first hash value as the first pre-stored mobile phone information.

The fourth sending module 1004 is configured to send current local hardware information to server.

The second receiving module 904 is configured to: receive, from the server, a verification result generated based on the identity information to be verified and pre-stored identity information, wherein the pre-stored identity information includes second pre-stored mobile phone number information and the current local hardware information, and the second pre-stored mobile phone number information is the mobile phone number determined based on the short message at the server.

Figure 12:
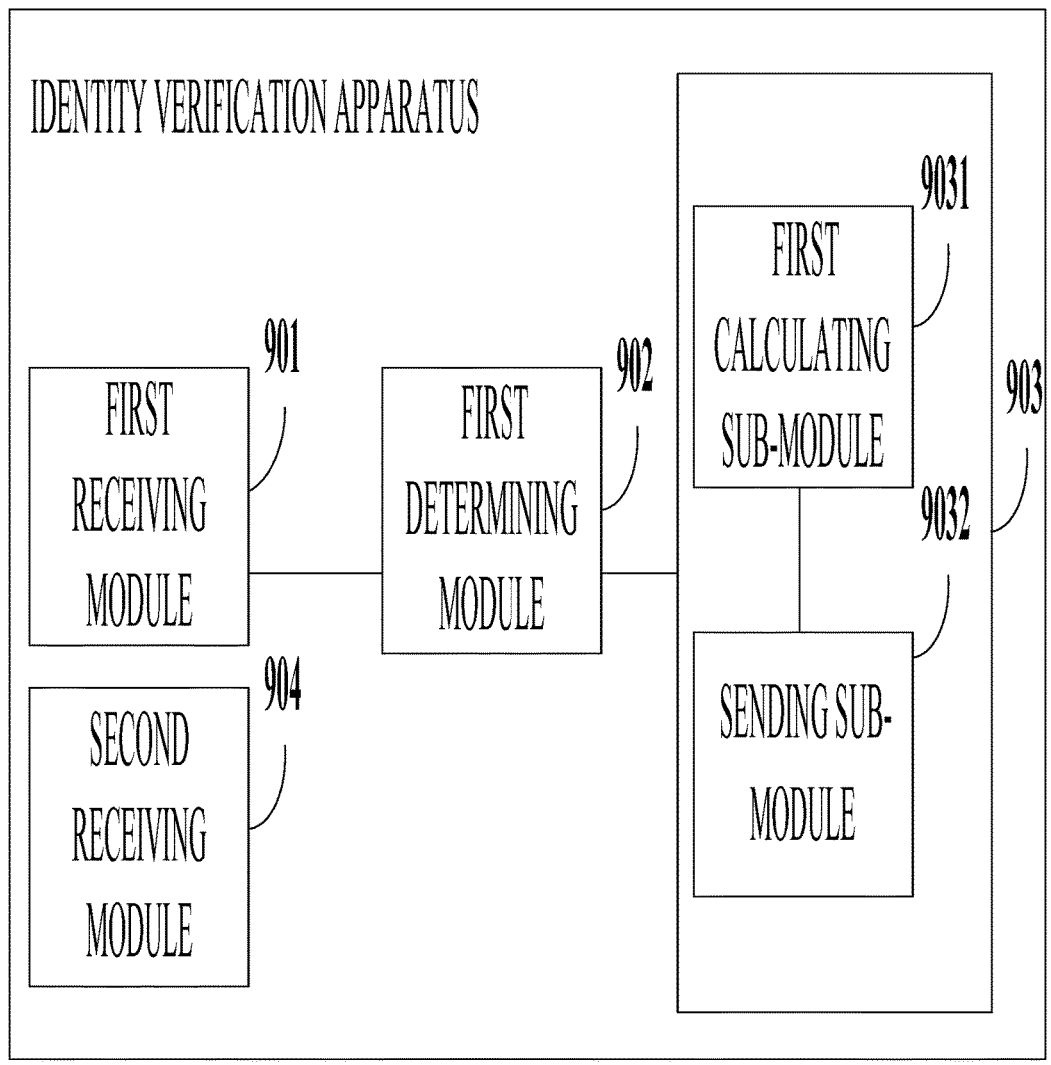
FIG. 12 is a block diagram of still another identity verification apparatus according to an exemplary embodiment.

FIG. 12 is a block diagram of still another identity verification apparatus according to an exemplary embodiment. As shown, further to the embodiment shown in any of FIG. 9, 10 or 11, the first sending module may comprise the following sub-modules 9031 and 9032.

The first calculating sub-module 9031 is configured to calculate a second hash value as the identity information to be verified, based on the local hardware information and the first pre-stored mobile phone number information.

The sending sub-module 9032 is configured to send the identity information to be verified to the server. The server can derive a third hash value from the pre-stored identity information and perform identity verification by comparing the second hash value with the third hash value.

Figure 13:
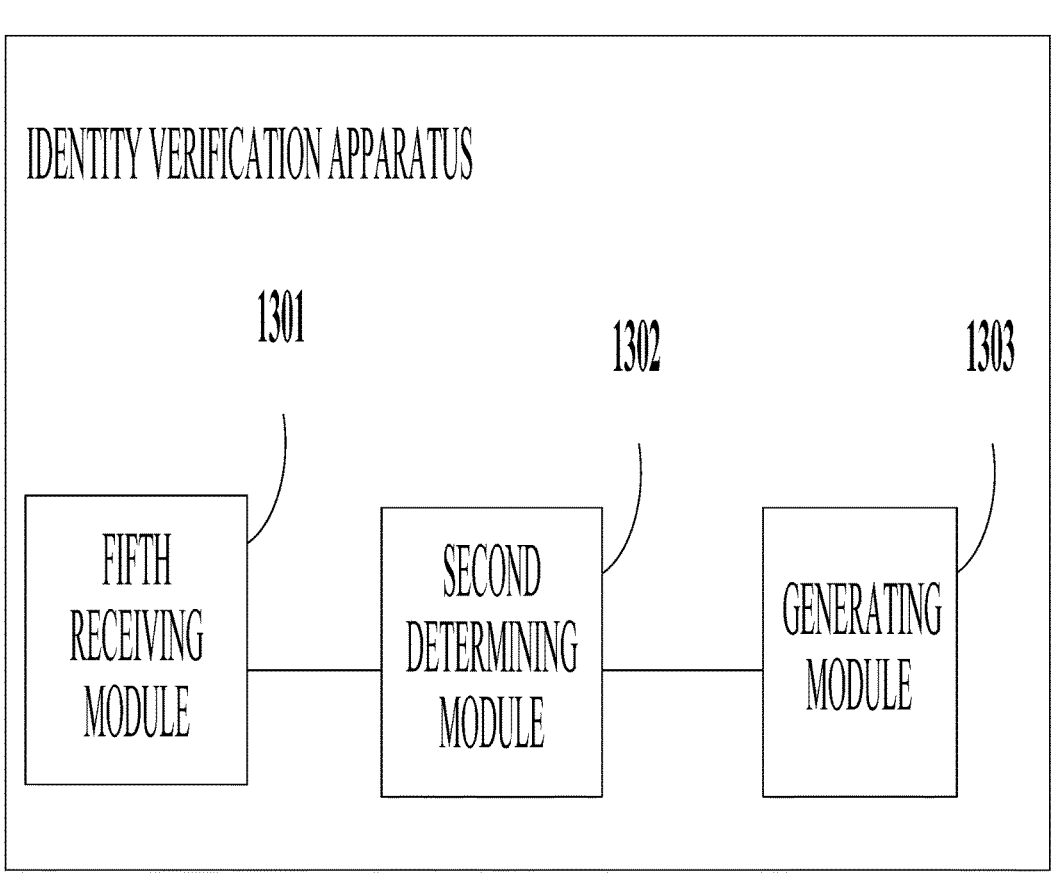
FIG. 13 is a block diagram of an identity verification apparatus according to an exemplary embodiment.

FIG. 13 is a block diagram of an identity verification apparatus according to an exemplary embodiment. As shown, the identity verification apparatus comprises the following modules 1301-1303.

The fifth receiving module 1301 is configured to receive an identity verification instruction from a server.

The second determining module 1302 is configured to, in response to the identity verification instruction, determine local hardware information and first pre-stored mobile phone number information, wherein the first pre-stored mobile phone number information is mobile phone number information pre-stored locally.

The generating module 1303 is configured to take the local hardware information and the first pre-stored mobile phone number information as identity information to be verified, and generate a verification result based on the identity information to be verified.

Figure 14:
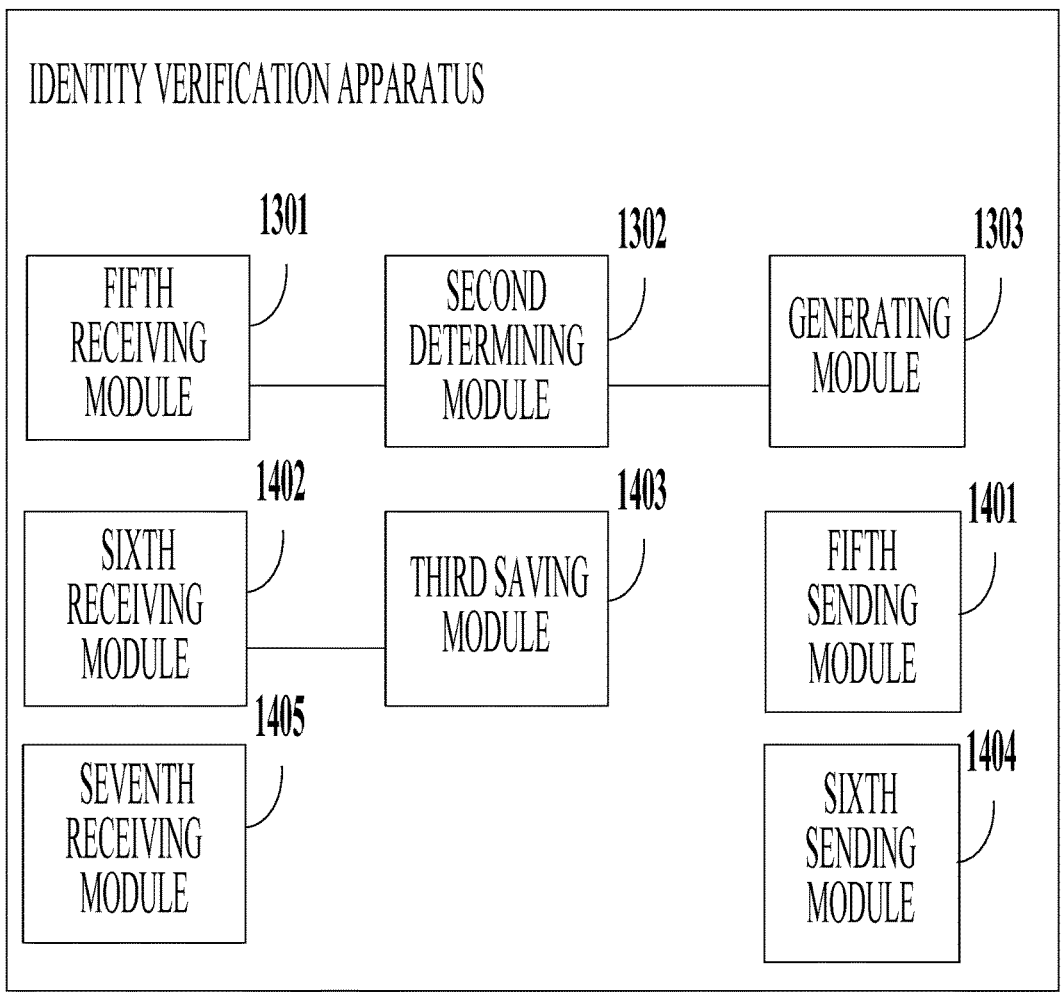
FIG. 14 is a block diagram of another identity verification apparatus according to an exemplary embodiment.

FIG. 14 is a block diagram of another identity verification apparatus according to an exemplary embodiment. As shown, further to the embodiment shown in FIG. 13, the identity verification apparatus may further comprise the following modules 1401-1405.

The fifth sending module 1401 is configured to send a short message to the server, the short message carrying information of a mobile phone number.

The sixth receiving module 1402 is configured to receive the mobile phone number from the server.

The third saving module 1403 is configured to save the mobile phone number as the first pre-stored mobile phone number information and second pre-stored mobile phone number information.

The sixth sending module 1404 is configured to send current local hardware information to the server.

The seventh receiving module 1405 is configured to receive the current local hardware information from the server.

The generating module 1303 is configured to generate the verification result based on the identity information to be verified and pre-stored identity information, the pre-stored identity information including the second pre-stored mobile phone number information and the current local hardware information.

In an embodiment, the local hardware may include a mobile phone device and a SIM card.

The local hardware information includes identification information of the mobile phone device and identification information and state information of the SIM card, and the state of the SIM card includes a state with network access permit and a state without network access permit.

In an embodiment, the identification information of the SIM card may include at least one of an Integrate Circuit Card IDentity (ICCID) and an International Mobile Subscriber Identification Number (IMSI).

Figure 15:
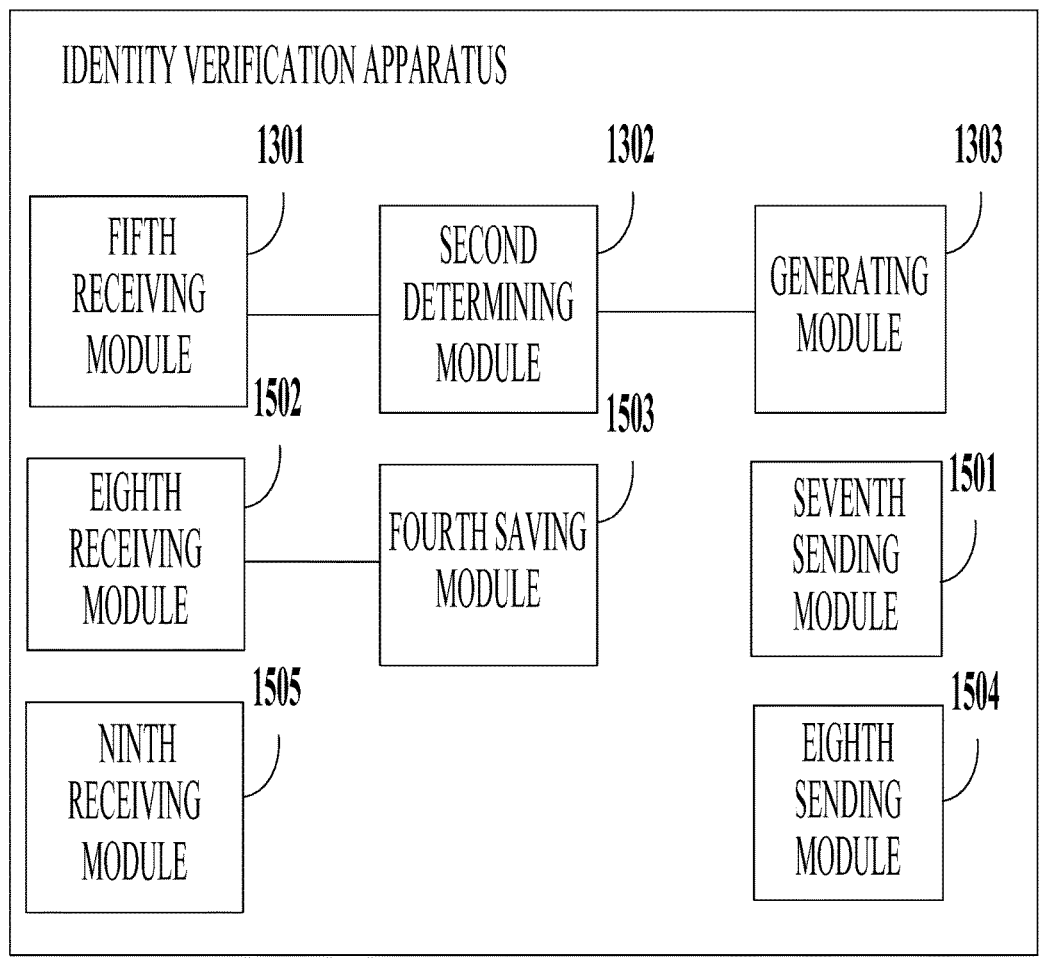
FIG. 15 is a block diagram of yet another identity verification apparatus according to an exemplary embodiment.

FIG. 15 is a block diagram of yet another identity verification apparatus according to an exemplary embodiment. As shown, further to the embodiment shown in FIG. 13, the identity verification apparatus may further comprise the following modules 1501-1505.

The seventh sending module 1501 is configured to send a short message to the server, the short message carrying information of a mobile phone number.

The eighth receiving module 1502 is configured to receive a first hash value from the server, the first hash value being a hash value of the mobile phone number.

The fourth saving module 1503 is configured to save the first hash value as the first pre-stored mobile phone number information and second pre-stored mobile phone number information.

The eighth sending module 1504 is configured to send current local hardware information to the server.

The ninth receiving module 1505 is configured to receive the current local hardware information from the server.

The generating module 1303 is configured to generate the verification result based on the identity information to be verified and pre-stored identity information, the pre-stored identity information including the second pre-stored mobile phone number information and the current local hardware information.

Figure 16:
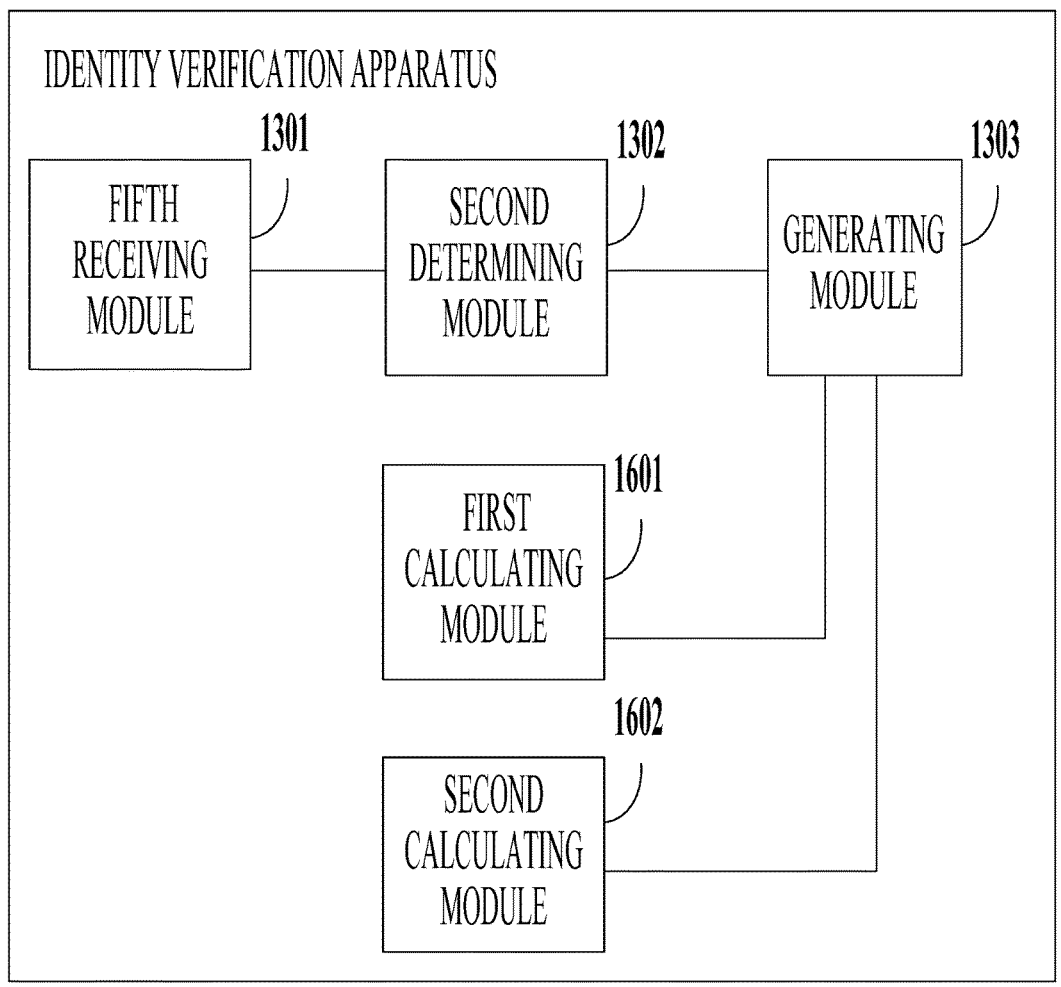
FIG. 16 is a block diagram of still another identity verification apparatus according to an exemplary embodiment.

FIG. 16 is a block diagram of still another identity verification apparatus according to an exemplary embodiment. As shown, further to the embodiment shown in any of FIG. 13, 14 or 15, the identity verification apparatus may further comprise the following modules 1601 and 1602.

The first calculating module 1601 is configured to calculate a second hash value based on the identity information to be verified.

The second calculating module 1602 is configured to calculate a third hash value based on the pre-stored identity information.

The generating module 1303 is configured to generate the verification result based on the second hash value and the third hash value.

As to the apparatus in the above embodiments, the specific manners for respective modules to perform operations have been described in detail in embodiments related to the methods, and will not be elaborated here.

Figure 17:
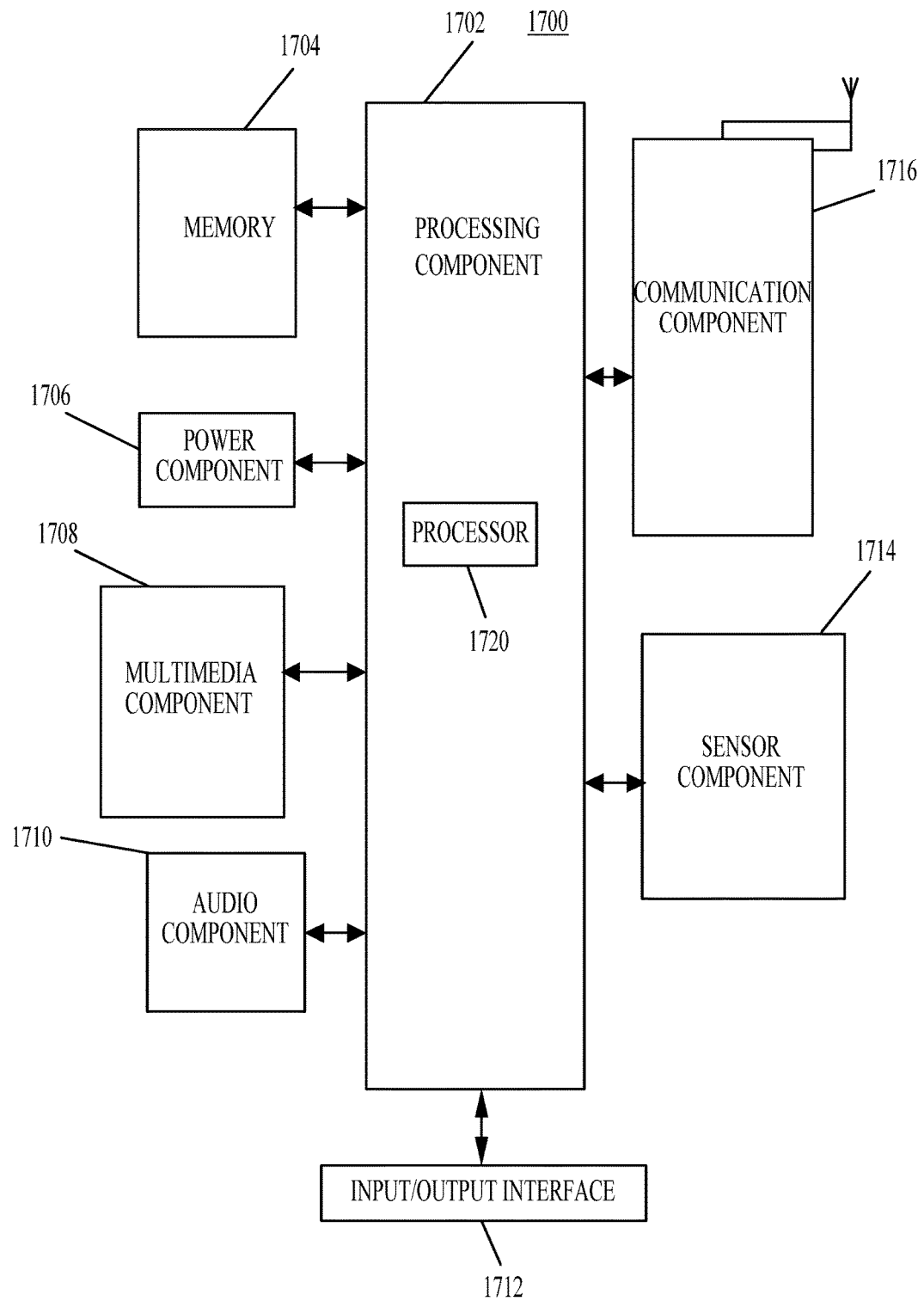
FIG. 17 is a block diagram of an identity verification apparatus according to an exemplary embodiment.

FIG. 17 is a block diagram of an identity verification apparatus according to an exemplary embodiment. For example, the apparatus 1700 may be a mobile phone, a computer, a digital broadcast terminal, a messaging device, a gaming console, a tablet device, a medical device, exercise equipment, a personal digital assistant or the like.

Referring to FIG. 17, the apparatus 1700 may comprise one or more of the following components: a processing component 1702, a memory 1704, a power component 1706, a multimedia component 1708, an audio component 1710, an input/output (I/O) interface 1712, a sensor component 1714 and a communication component 1716.

The processing component 1702 typically controls overall operations of the apparatus 1700, such as the operations associated with display, telephone calls, data communications, camera operations and recording operations. The processing component 1702 may include one or more processors 1720 to execute instructions to perform all or some of the steps in the above described methods. Moreover, the processing component 1702 may include one or more modules which facilitate the interaction between the processing component 1702 and other components. For example, the processing component 1702 may comprise a multimedia module to facilitate the interaction between the multimedia component 1708 and the processing component 1702.

The memory 1704 is configured to store various types of data to support the operation of the apparatus 1700. Examples of such data comprise instructions for any applications or methods operated on the apparatus 1700, contact data, phonebook data, messages, pictures, video, etc. The memory 1704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the apparatus 1700. The power component 1706 may comprise a power management system, one or more power sources, and any other components associated with the generation, management, and distribution of power in the apparatus 1700.

The multimedia component 1708 comprises a screen providing an output interface between the apparatus 1700 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the apparatus 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the apparatus 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 comprises one or more sensors to provide status assessments of various aspects of the apparatus 1700. For instance, the sensor component 1714 may detect an open/closed status of the apparatus 1700, relative positioning of components, e.g., the display and the keypad, of the apparatus 1700, a change in position of the apparatus 1700 or a component of the apparatus 1700, presence or absence of user's contact with the apparatus 1700, an orientation or an acceleration/deceleration of the apparatus 1700, and a change in temperature of the apparatus 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor or a temperature sensor.

The communication component 1716 is configured to facilitate communication, wired or wirelessly, between the apparatus 1700 and other devices. The apparatus 1700 can access a wireless network based on a communication standard, such as WiFi, 2G or 3G or a combination thereof. In one embodiment, the communication component 1716 receives a broadcast signal or broadcast associated information from an external broadcast management system via a broadcast channel. In one embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the apparatus 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an embodiment, there is also provided a non-transitory computer-readable storage medium comprising instructions, such as comprised in the memory 1704, executable by the processor 1720 in the apparatus 1700, for performing the above-described methods. For example, the non-transitory computer-readable storage medium may be a ROM, a RAM, a CD-ROM, a magnetic tape, a floppy disc, an optical data storage device or the like.

Figure 18:
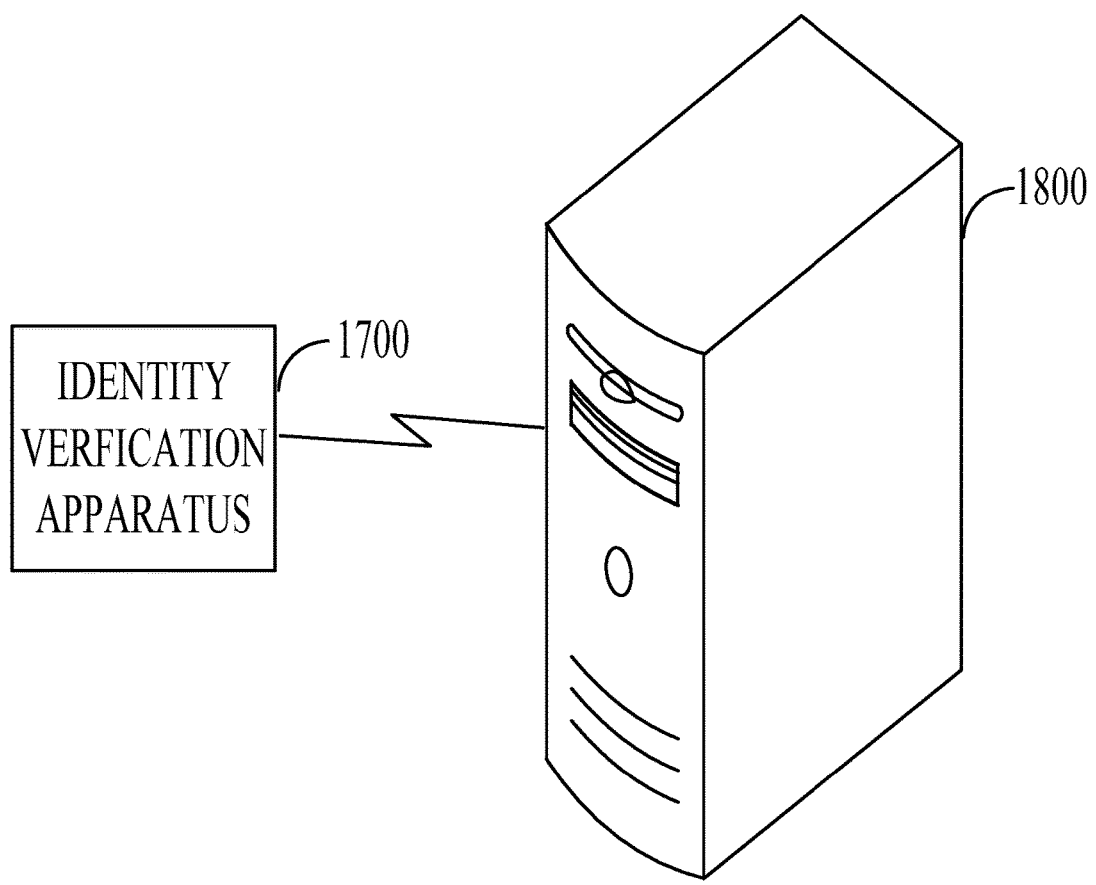
FIG. 18 is a block diagram of an identity verification system according to an exemplary embodiment.

FIG. 18 is a block diagram of an identity verification system according to an exemplary embodiment. As shown, the identity verification system comprises an identity verification apparatus 1700 and a server 1800.

The identity verification apparatus 1700 is configured to: receive an identity verification instruction from the server; in response to the identity verification instruction, determine local hardware information of local hardware and first pre-stored mobile phone number information, wherein the first pre-stored mobile phone number information is mobile phone number information pre-stored locally; send, to the server, the local hardware information and the first pre-stored mobile phone number information as identity information to be verified; and receive a verification result generated by the server based on the identity information to be verified.

The server 1800 is configured to: send the identity verification instruction; receive the identity information to be verified; and generate the verification result based on the identity verification information to be verified.

Reference can also be made to FIG. 18, for a block diagram of an identity verification system according to another exemplary embodiment of the disclosure. As shown, the identity verification system comprises an identity verification apparatus 1700 and a server 1800.

The identity verification apparatus 1700 is configured to: receive an identity verification instruction from the server; in response to the identity verification instruction, determine local hardware information and first pre-stored mobile phone number information, wherein the first pre-stored mobile phone number information is mobile phone number information pre-stored locally; and take the local hardware information and the first pre-stored mobile phone number information as identity information to be verified, and generate a verification result based on the identity information to be verified.

The server 1800 is configured to send the identity verification instruction.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. An identity verification method, comprising:
   receiving an identity verification instruction from a server;

in response to the identity verification instruction, determining local hardware information of local hardware and first pre-stored mobile phone number information, wherein the first pre-stored mobile phone number information is mobile phone number information pre-stored locally;

sending, to the server, the local hardware information and the first pre-stored mobile phone number information as identity information to be verified;

sending current local hardware information to the server, and receiving, from the server, a verification result generated based on the identity information to be verified and pre-stored identity information, wherein the pre-stored identity information includes second pre-stored mobile phone number information and the current local hardware information, and the second pre-stored mobile phone number information is the mobile phone number determined based on the short message at the server.

2. The method of claim 1, further comprising:
sending a short message to the server, the short message carrying information of a mobile phone number;
receiving the mobile phone number from the server; and
saving the mobile phone number as the first pre-stored mobile phone number information.

3. The method of claim 1, further comprising:
sending a short message to the server, the short message carrying information of a mobile phone number;
receiving a hash value from the server, the hash value being a hash value of the mobile phone number; and
saving the hash value as the first pre-stored mobile phone information.

4. The method of claim 2, further comprising:
sending current local hardware information to the server, wherein receiving the verification result generated by the server based on the identity information to be verified comprises:
receiving, from the server, a verification result generated based on the identity information to be verified and pre-stored identity information, wherein the pre-stored identity information includes second pre-stored mobile phone number information and the current local hardware information, and the second pre-stored mobile phone number information is the mobile phone number determined based on the short message at the server.

5. The method of claim 1, wherein sending, to the server, the local hardware information and the first pre-stored mobile phone number information as the identity information to be verified comprises:
calculating a hash value as the identity information to be verified, based on the local hardware information and the first pre-stored mobile phone number information; and
sending the identity information to be verified to the server.

6. The method of claim 1, wherein the local hardware includes a mobile phone device and a SIM card; and
the local hardware information includes identification information of the mobile phone device and identification information and state information of the SIM card, and the state of the SIM card includes a state with network access permit or a state without network access permit.

7. The method of claim 5, wherein the identification information of the SIM card includes at least one of an Integrate Circuit Card IDentity (ICCID) and an International Mobile Subscriber Identification number (IMSI).

8. An identity verification apparatus, comprising:
a processor, and
a memory storing instructions executable by the processor,
wherein the processor is configured to:
receive an identity verification instruction from a server;
in response to the identity verification instruction, determine local hardware information of local hardware and first pre-stored mobile phone number information, wherein the first pre-stored mobile phone number information is mobile phone number information pre-stored locally;
send, to the server, the local hardware information and the first pre-stored mobile phone number information as identity information to be verified; and
send current local hardware information to the server, and
receive, from the server, a verification result generated based on the identity information to be verified and pre-stored identity information, wherein the pre-stored identity information includes second pre-stored mobile phone number information and the current local hardware information, and the second pre-stored mobile phone number information is the mobile phone number determined based on the short message at the server.

9. The apparatus of claim 8, wherein the processor is further configured to:
send a short message to the server, the short message carrying information of a mobile phone number;
receive the mobile phone number from the server; and
save the mobile phone number as the first pre-stored mobile phone number information.

10. The apparatus of claim 8, wherein the processor is further configured to:
send a short message to the server, the short message carrying information of a mobile phone number;
receive a hash value from the server, the hash value being a hash value of the mobile phone number; and
save the hash value as the first pre-stored mobile phone information.

11. The apparatus of claim 9, wherein the processor is further configured to: send current local hardware information to the server,
wherein receiving the verification result generated by the server based on the identity information to be verified comprises:
receiving, from the server, a verification result generated based on the identity information to be verified and pre-stored identity information, wherein the pre-stored identity information includes second pre-stored mobile phone number information and the current local hardware information, and the second pre-stored mobile phone number information is the mobile phone number determined based on the short message at the server.

12. The apparatus of claim 8, wherein sending, to the server, the local hardware information and the first pre-stored mobile phone number information as the identity information to be verified comprises:
calculating a hash value as the identity information to be verified, based on the local hardware information and the first pre-stored mobile phone number information; and
sending the identity information to be verified to the server.

13. The apparatus of claim 8, wherein the local hardware includes a mobile phone device and a SIM card; and the local hardware information includes identification information of the mobile phone device and identification information and state information of the SIM card, and the state of the SIM card includes a state with network access permit or a state without network access permit.

14. The apparatus of claim 12, wherein the identification information of the SIM card includes at least one of an Integrate Circuit Card IDentity (ICCID) and an International Mobile Subscriber Identification number (IMSI).

15. A non-transitory computer-readable storage medium having stored therein instructions that, when executed by a processor of a mobile terminal, cause the mobile terminal to perform an identity verification method, the method comprising: receiving an identity verification instruction from a server; in response to the identity verification instruction, determining local hardware information of local hardware and first pre-stored mobile phone number information, wherein the first pre-stored mobile phone number information is mobile phone number information pre-stored locally; sending, to the server, the local hardware information and the first pre-stored mobile phone number information as identity information to be verified; sending current local hardware information to the server, and receiving, from the server, a verification result generated based on the identity information to be verified and pre-stored identity information, wherein the pre-stored identity information includes second pre-stored mobile phone number information and the current local hardware information, and the second pre-stored mobile phone number information is the mobile phone number determined based on the short message at the server.

16. The storage medium of claim 15, wherein the method further comprises:

sending a short message to the server, the short message carrying information of a mobile phone number;

receiving the mobile phone number from the server; and saving the mobile phone number as the first pre-stored mobile phone number information.

17. The storage medium of claim 15, wherein the method further comprises:

sending a short message to the server, the short message carrying information of a mobile phone number;

receiving a hash value from the server, the hash value being a hash value of the mobile phone number; and saving the hash value as the first pre-stored mobile phone information.

* * * * *